United States Patent
Choi

(10) Patent No.: US 9,826,084 B2
(45) Date of Patent: Nov. 21, 2017

(54) APPARATUS AND METHOD FOR CONTROLLING PORTABLE DEVICE IN VEHICLE

(71) Applicant: LG Electronics Inc., Seoul (KR)

(72) Inventor: Junho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/236,052

(22) Filed: Aug. 12, 2016

(65) Prior Publication Data

US 2017/0054842 A1    Feb. 23, 2017

(30) Foreign Application Priority Data

Aug. 21, 2015  (KR) .......... 10-2015-0118159

(51) Int. Cl.
*H04M 3/42*  (2006.01)
*H04M 1/725*  (2006.01)
*B60W 40/08*  (2012.01)
*G05D 1/00*  (2006.01)
*H04W 4/00*  (2009.01)
*H04W 4/02*  (2009.01)
*H04W 4/04*  (2009.01)
*G06F 3/01*  (2006.01)
*H04M 1/60*  (2006.01)

(52) U.S. Cl.
CPC ........ *H04M 1/72577* (2013.01); *B60W 40/08* (2013.01); *G05D 1/0061* (2013.01); *H04W 4/008* (2013.01); *H04W 4/021* (2013.01); *H04W 4/026* (2013.01); *H04W 4/027* (2013.01); *H04W 4/046* (2013.01); *G06F 3/013* (2013.01); *H04M 1/6091* (2013.01); *H04M 2201/40* (2013.01); *H04M 2250/52* (2013.01)

(58) Field of Classification Search
USPC ............................................... 455/414.1, 411
See application file for complete search history.

(56) References Cited

U.S. PATENT DOCUMENTS

2006/0284769 A1   12/2006  Bolduc et al.
2011/0298924 A1   12/2011  Miller et al.
2012/0214472 A1    8/2012  Tadayon et al.
2015/0126171 A1    5/2015  Miller et al.

*Primary Examiner* — Joel Ajayi
(74) *Attorney, Agent, or Firm* — Birch, Stewart, Kolasch & Birch, LLP

(57) ABSTRACT

A portable device control apparatus including a communication unit configured to detect at least a first portable device in a passenger compartment of a vehicle; and a processor configured to select at least one function of the first portable device to be deactivated based on the first portable device being located within a predetermined limit region including at least part of the driving seat of the vehicle, and transmit a command for deactivating an execution of at least one function to the first portable device through the communication unit.

16 Claims, 30 Drawing Sheets

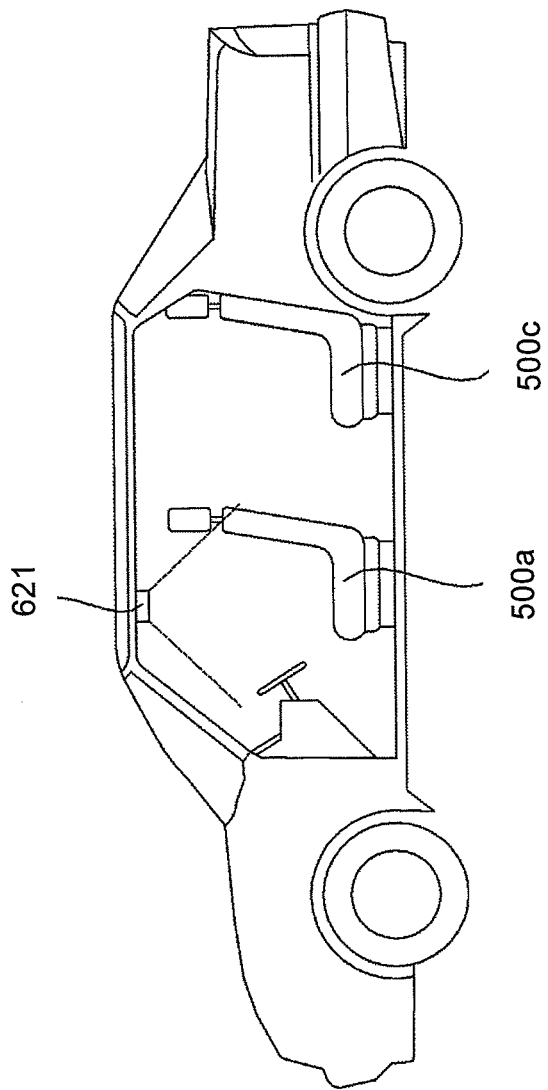

FIG. 9A

| SIGNAL STRENGTH | REGION |
|---|---|
| ≥threshold value | LIMITED REGION |
| <threshold value | NON-LIMITED REGION |

| VEHICLE SPEED(km/h) | FUNCTION |
|---|---|
| 0 ≤ V < 30 | MESSAGE TRANSMISSION |
| 30 ≤ V < 100 | MESSAGE TRANSMISSION, INTERNET ACCESS |
| 100 ≤ V | MESSAGE TRANSMISSION, INTERNET ACCESS, INFORMATION DISPLAY |

960

| ROAD | FUNCTION |
|---|---|
| EXPRESSWAY | MESSAGE TRANSMISSION, PHOTO CAPTURE |
| SCHOOL ZONE | MESSAGE TRANSMISSION, MESSAGE COMPOSITION |
| SHARP CURVE AREA | MESSAGE TRANSMISSION, INFORMATION DISPLAY |

970

| PAST DRIVING HISTORY | FUNCTION |
|---|---|
| ACCIDENT AT LOCATION A | MESSAGE TRANSMISSION, MESSAGE COMPOSITION, INFORMATION DISPLAY |
| ROUTE DEVIATION AT LOCATION B | MESSAGE TRANSMISSION, MUSIC PLAYBACK |

| REFERENCE IMAGE | PASSENGER |
|---|---|
| FIRST IMAGE | Liam |
| SECOND IMAGE | Ethan |
| THIRD IMAGE | Diana |

FIG. 16B

| PASSENGER | ACCESS AUTHORITY |
|---|---|
| Liam | FRIENDS, FAMILY MEMBERS |
| Ethan | ALL |
| Diana | FRIENDS |

APPARATUS AND METHOD FOR CONTROLLING PORTABLE DEVICE IN VEHICLE

CROSS-REFERENCE TO RELATED APPLICATION

This application claims the priority benefit of Korean Patent Application No. 10-2015-0118159, filed on Aug. 21, 2015 in the Republic of Korea, the disclosure of which is incorporated herein by reference.

BACKGROUND OF THE INVENTION

1. Field of the Invention

The present invention relates to a portable device control apparatus and method and, more particularly to, an apparatus and method for controlling operation of a portable device according to the location of the portable device in a vehicle.

2. Description of the Related Art

A vehicle refers to an apparatus that transports people, cargo, and the like from one place to another place via driving of wheels. Examples of vehicles include two-wheeled vehicles such as motorcycles, and four-wheeled vehicles such as cars and trains.

To increase the safety and convenience of a user who drives a vehicle, technology to equip vehicles with a variety of sensors and electronic devices is being aggressively developed. In particular, various types of driver assistance devices, which are developed for the convenience of a driver, have been mounted in vehicles.

In addition, various types of portable devices such as smartphones, notebook computers, and tablets have become essential items. As such, the danger of an accident caused by using a portable device while driving has emerged as an important issue. In particular, recent research indicates that a traffic accident rate increases by several tens of times when a portable device is used while driving. In addition, when a portable device is used while driving, driver reaction time becomes similar to that when driving drunk. For example, response time to a variety of situations may be longer than when a portable device is not used while driving. As such, movements for regulating the use of a portable device while driving have become increasingly enforced worldwide.

Some portable devices have a function of automatically deactivating execution of a specific function when users of the portable devices enter a vehicle. However, such a function still has a problem in that execution of a specific function is deactivated for the driver and even for passengers who carry the portable devices.

SUMMARY OF THE INVENTION

Therefore, the present invention has been made in view of the above problems, and it is an object of the present invention to provide an apparatus and method for controlling operation of a portable device according to the location of the portable device in a vehicle. In particular, the present invention provides a portable device control apparatus and method for deactivating at least one function of a portable device only when a user of the portable device is a driver.

The objects of the present invention are not limited to what has been particularly described hereinabove and other objects not described herein will be more clearly understood by persons skilled in the art from the following description.

In accordance with an aspect of the present invention, the above and other objects can be accomplished by the provision of a portable device control apparatus including a communication unit configured to detect at least one portable device in a passenger compartment of a vehicle, the at least one portable device including a first portable device, and a processor configured to judge whether the first portable device is within a predetermined limited region including at least a part of a driving seat of the vehicle, to determine at least one function of the first portable device whose execution is to be deactivated in the first portable device when the first portable device is within the limited region, and to transmit a command for deactivating execution of the at least one function to the first portable device through the communication unit.

Details of other embodiments are included in the following description and the accompanying drawings.

BRIEF DESCRIPTION OF THE DRAWINGS

The above and other objects, features and other advantages of the present invention will be more clearly understood from the following detailed description taken in conjunction with the accompanying drawings, in which:

FIGS. 7A and 7B illustrate a limited region determined with respect to a passenger compartment illustrated in FIG. 5 according to an embodiment of the present invention;

FIG. 9A illustrates an exemplary data structure used to detect the location of a portable device in a vehicle according to an embodiment of the present invention and FIG. 9B illustrates a limited region defined by the data structure illustrated in FIG. 9A according to an embodiment of the present invention;

FIG. 9E illustrates exemplary data structures used to determine a function whose execution is deactivated in a portable device within the limited region according to an embodiment of the present invention;

FIG. 16A illustrates an exemplary data structure used to confirm the identities of passengers in a vehicle according to an embodiment of the present invention;

FIG. 16B illustrates an exemplary data structure used to identify access authority of passengers in a vehicle in relation to FIG. 16A according to an embodiment of the present invention;

DETAILED DESCRIPTION OF THE PREFERRED EMBODIMENTS

Figure 1:
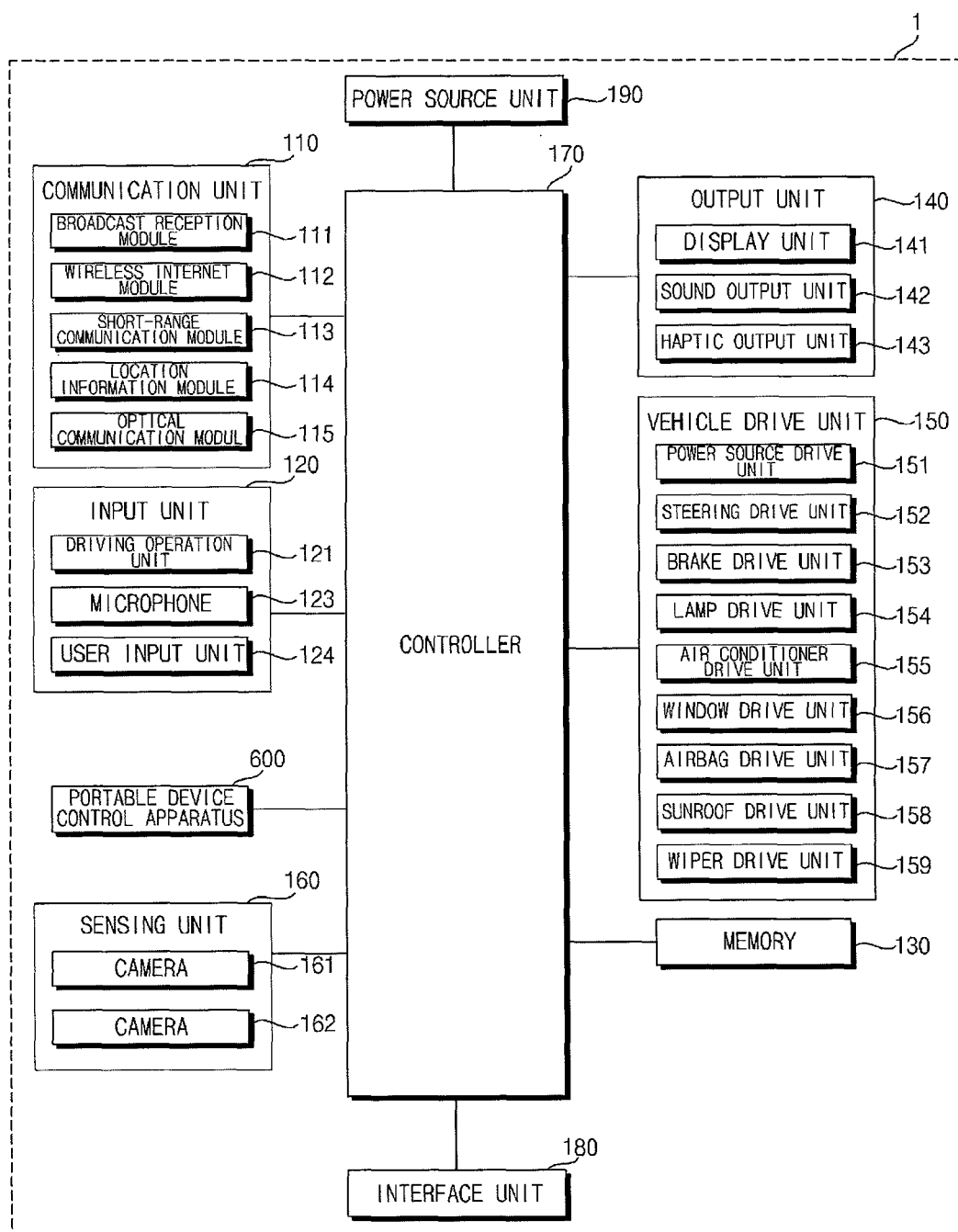
FIG. 1 is a block diagram of a vehicle according to one embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present. In addition, it will be understood that when a component is referred to as "controlling" another component, it may directly control another component, or may also control another component via the mediation of a third component. In addition, it will be understood that when a component is referred to as "providing" another component with information and signals, it may directly provide another component with the same and may also provide another component with the same via the mediation of a third component.

As used herein, the singular form is intended to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include all of an internal combustion engine vehicle including an engine as a power source, a hybrid vehicle including both an engine and an electric motor as a power source, and an electric vehicle including an electric motor as a power source.

FIG. 1 is a block diagram of a vehicle 1 according to one embodiment of the present invention.

The vehicle 1 may include a communication unit 110, an input unit 120, a memory 130, an output unit 140, a vehicle drive unit 150, a sensing unit 160, a controller 170, an interface unit 180, a power supply unit 190, and a portable device control apparatus 600.

The communication unit 110 may include one or more modules to enable wireless communication between the vehicle 1 and an external device (e.g., a mobile terminal, an external server, or another vehicle). In addition, the communication unit 110 may include one or more modules to connect the vehicle 1 to one or more networks.

The communication unit 110 may include a broadcast reception module 111, a wireless Internet module 112, a short-range communication module 113, a location information module 114, and an optical communication module 115.

The broadcast reception module 111 is configured to receive a broadcast signal or broadcast associated information from an external broadcast managing server via a broadcast channel. The broadcast can include radio broadcast or TV broadcast.

The wireless Internet module 112 is a module for wireless Internet access. The wireless Internet module 112 may be internally or externally coupled to the vehicle 1. The wireless Internet module 712 is configured to transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 112 transmits and receives data according to one or more of such wireless Internet technologies and other Internet technologies as well. For example, the wireless Internet module 112 may exchange data with the external server in a wireless manner. The wireless Internet module 112 may receive weather information and road traffic state information (e.g., Transport Protocol Expert Group (TPEG) information) from the external server.

The short-range communication module 113 may assist short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 113 may form wireless area networks to perform short-range communication between the vehicle 1 and at least one external device. For example, the short-range communication module 113 may exchange data with a mobile terminal of a passenger in a wireless manner. The short-range communication module 113 may receive weather information and road traffic state information (e.g., TPEG information) from the mobile terminal or the external server. When a user gets into the vehicle 1, the mobile terminal of the user and the vehicle 1 may be paired with each other automatically or as the user executes a pairing application.

The location information module 114 is a module to acquire a location of the vehicle 1. A representative example of the location information module 114 includes a Global Positioning System (GPS) module. For example, when the vehicle utilizes a GPS module, a location of the vehicle 1 may be acquired using signals transmitted from GPS satellites.

The optical communication module 115 may include a light emitting unit and a light receiving unit.

The light receiving unit may convert light into electrical signals to receive information. The light receiving unit may include Photodiodes (PDs) to receive light. The PDs may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to externally emit the light. For example, the light emitting unit may externally emit light by flickering light emitting elements at a prescribed frequency. In some embodiments, the light emitting unit may include an array of a plurality of light emitting elements. In some embodiments, the light emitting unit may be integrated with a lamp provided in the vehicle 1. For example, the light emitting unit may be at least one selected from among a headlight, a taillight, a brake light, a turn signal light, and a sidelight. For example, the optical communication module 115 may exchange data with another vehicle via optical communication.

The input unit 120 may include a driving operation unit 121, a microphone 123, and a user input unit 124.

The driving operation unit 121 is configured to receive user input for the driving of the vehicle 1. The driving operation unit 121 may include a steering input unit 121a, a shift input unit 121b, an acceleration input unit 121c, and a brake input unit 121d.

The steering input unit 121a is configured to receive user input with regard to the direction of travel of the vehicle 1. The steering input unit 121a may include a steering wheel. In some embodiments, the steering input unit 121a may be configured by a touchscreen, a touch pad, or a button.

The shift input unit 121b is configured to receive input for selecting one of Park (P), Drive (D), Neutral (N), and Reverse (R) gears of the vehicle 1 from the user. The shift input unit 121b may have a lever form. In some embodiments, the shift input unit 121b may be configured by a touchscreen, a touch pad, or a button.

The acceleration input unit 121c is configured to receive user input for acceleration of the vehicle 1. The brake input unit 121d is configured to receive user input for speed reduction of the vehicle 1. Each of the acceleration input unit 121c and the brake input unit 121d may have a pedal form. In some embodiments, the acceleration input unit 121c or the brake input unit 121d may be configured by a touchscreen, a touch pad, or a button.

The microphone 123 may process external sound signals into electrical data. The processed data may be utilized in various ways according to a function that the vehicle 1 is performing. The microphone 123 may convert a user voice command into electrical data. The converted electrical data may be transmitted to the controller 170.

The user input unit 124 is configured to receive information from the user. When information is input via the user input unit 124, the controller 170 may control operation of the vehicle 1 to correspond to the input information. The user input unit 124 may include a touch input unit or a mechanical input unit. In some embodiments, the user input unit 124 may be located in a region of the steering wheel. In this instance, the driver may operate the user input unit 124 with the fingers while gripping the steering wheel.

The sensing unit 160 is configured to sense signals associated with, for example, driving of the vehicle 1. Thus, the sensing unit 160 may include a collision sensor, a steering sensor, a speed sensor, a gradient sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, an infrared sensor, a radar, and a lidar.

As such, the sensing unit 160 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, and steering wheel rotation angle information. In addition, the portable device control apparatus 600, which will be described below, may generate control signals for acceleration, speed reduction, and direction change of the vehicle 1, for example, based on surrounding environment information acquired by at least one of the camera, the ultrasonic sensor, the infrared sensor, the radar, and the lidar included in the vehicle 1. Here, the surrounding environment information may be information related to various objects located within a prescribed traveling distance range from the vehicle 1. For example, the surrounding environment information may include the number of obstacles located within a distance of 100 m from the vehicle 1, the distances to the obstacles, the sizes of the obstacles, the kinds of the obstacles, and the like. The surrounding environment information may also include weather of an area in which the vehicle is currently located. The surrounding environment information may further include the type of a road, weather, a traffic situation, a searched route, and the like.

Meanwhile, the sensing unit 160 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 160 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, an internal camera 162 and the microphone 123 may operate as sensors. The biometric information sensing unit may acquire hand geometry information and facial recognition information via the internal camera 162.

The sensing unit 160 may include at least one camera 161 to capture an image of the outside of the vehicle 1. For example, the sensing unit 160 may include a plurality of cameras 161 arranged at different positions at the exterior of the vehicle 1. Each camera 161 may include an image sensor and an image processing module. The camera 161 may process a still image or moving image acquired by the image sensor (e.g., a Complementary Metal Oxide Semiconductor (CMOS) or a Charge Coupled Device (CCD)). The image processing module may extract required information by processing the still image or moving image acquired by the image sensor, and may transmit the extracted information to the controller 170.

The sensing unit 160 may include at least one camera 162 to capture an image of the space inside the vehicle 1. For example, the camera 162 may form an image including a passenger of the vehicle 1 and then provide the controller 170 with the image.

The cameras 161 and 162 may respectively include the image sensor (e.g., a CMOS or CCD) and the image processing module. In addition, the cameras 161 and 162 may process a still image or moving image acquired by the image sensor. The image processing module may process a still image or moving image acquired by the image sensor. In addition, the cameras 161 and 162 may acquire an image including at least one of traffic lights, traffic signs, pedestrians, other vehicles, and road surfaces.

Meanwhile, although FIG. 1 illustrates the sensing unit 160 as being included in the vehicle 1, at least one sensor included in the sensing unit 160 may be described as a component included in the portable device control apparatus 600 rather than the vehicle 1.

The output unit 140 is configured to output information processed in the controller 170. The output unit 140 may include a display unit 141, a sound output unit 142, and a haptic output unit 143.

The display unit 141 may display information processed in the controller 170. For example, the display unit 141 may display vehicle associated information. Here, the vehicle associated information may include vehicle control information for the direct control of the vehicle 1 or driver assistance information to aid the driver in driving. In addition, the vehicle associated information may include vehicle state information that indicates the current state of the vehicle or vehicle traveling information regarding traveling of the vehicle. For example, the vehicle state information may include at least one of a current velocity of the vehicle, a current direction of the vehicle, the current amount of remaining fuel, and a current location of the vehicle.

The display unit 141 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 141 may configure an inter-layer structure with a touch sensor, or may be integrally formed with the touch sensor to implement a touchscreen. The touchscreen may function as the user input unit 124 which provides an input interface between the vehicle 1 and the user and also function to provide an output interface between the vehicle 1 and the user. In this instance, the display unit 141 may include a touch sensor which senses a touch to the display unit 141 so as to receive a control command in a touch manner. When a touch is input to the display unit 141 as described above, the touch sensor may sense the touch and the controller 170 may generate a control command corresponding to the touch. Content input in a touch manner may be characters or numbers or may be menu items that can be instructed or designated in various modes.

In addition, the display unit 141 may include a cluster to allow the driver to check vehicle state information or vehicle traveling information while driving the vehicle. The cluster may be located on a dashboard. In this instance, the driver may check information displayed on the cluster while looking forward.

Further, in some embodiments, the display unit 141 may be implemented as a Head Up display (HUD). When the display unit 141 is implemented as a HUD, information may be output via a transparent display provided at the windshield. Alternatively, the display unit 141 may include a projector module to output information via an image projected onto the windshield.

The sound output unit 142 is configured to convert electrical signals from the controller 170 into audio signals and to output the audio signals. Thus, the sound output unit 142 may include, for example, a speaker. The sound output unit 142 may output sound corresponding to operation of the user input unit 124.

The haptic output unit 143 is configured to generate tactile output. For example, the haptic output unit 143 may operate to vibrate a steering wheel, a safety belt, or a seat so as to allow the user to recognize an output thereof.

The vehicle drive unit 150 may control operation of various devices of the vehicle 1. The vehicle drive unit 150 may include at least one of a power source drive unit 151, a steering drive unit 152, a brake drive unit 153, a lamp drive unit 154, an air conditioner drive unit 155, a window drive unit 156, an airbag drive unit 157, a sunroof drive unit 158, and a wiper drive unit 159.

The power source drive unit 151 may perform electronic control of a power source inside the vehicle 1. The power source drive unit 151 may include an acceleration device to increase the speed of the vehicle 1 and a speed reduction device to reduce the speed of the vehicle 1.

For example, in the situation where a fossil fuel based engine is a power source, the power source drive unit 151 may perform electronic control of the engine. As such, the power source drive unit 151 may control, for example, an output torque of the engine. In the situation where the power source drive unit 151 is the engine, the power source drive unit 151 may control the speed of the vehicle by controlling the output torque of the engine under control of the controller 170.

As another example, in the situation where an electric motor is a power source, the power source drive unit 151 may perform control for the motor. As such, the power source drive unit 151 may control, for example, the RPM and torque of the motor.

The steering drive unit 152 may include a steering apparatus. Thus, the steering drive unit 152 may perform electronic control of a steering apparatus inside the vehicle 1. For example, the steering drive unit 152 may include a steering torque sensor, a steering angle sensor, and a steering motor. The steering torque, applied to the steering wheel 12 by the driver, may be sensed by the steering torque sensor. The steering drive unit 152 may control steering force and a steering angle by changing the magnitude and direction of current applied to the steering motor based on, for example, the speed and the steering torque of the vehicle 1. In addition, the steering drive unit 152 may judge whether the direction of travel of the vehicle 1 is correctly being adjusted based on steering angle information acquired by the steering angle sensor. As such, the steering drive unit 152 may change the direction of travel of the vehicle 1. In addition, the steering drive unit 152 may reduce the resistance of the steering wheel 12 by increasing the steering force of the steering motor when the vehicle 1 travels at a low speed and may increase the resistance of weight of the steering wheel 12 by reducing the steering force of the steering motor when the vehicle 1 travels at a high speed. In addition, when the autonomous driving function of the vehicle 1 is executed, the steering drive unit 152 may control the steering motor to generate appropriate steering force based on, for example, the sensing signals output from the sensing unit 160 or control signals provided by a processor 570 even in the state in which the driver operates the steering wheel 12 (i.e. in the state in which no steering torque is sensed).

The brake drive unit 153 may perform electronic control of a brake apparatus inside the vehicle 1. For example, the brake drive unit 153 may reduce the speed of the vehicle 1 by controlling operation of brakes located at wheels. In another example, the brake drive unit 153 may adjust the direction of travel of the vehicle 1 leftward or rightward by controlling operation of respective brakes located at left and right wheels.

The lamp drive unit 154 may turn at least one lamp arranged inside and outside the vehicle 1 on or off. The lamp drive unit 154 may include a lighting apparatus. In addition, the lamp drive unit 154 may control, for example, the intensity and direction of light of each lamp included in the lighting apparatus. For example, the lamp drive unit 154 may perform control of a turn signal lamp, a headlamp or a brake lamp.

The air conditioner drive unit 155 may perform electronic control of an air conditioner inside the vehicle 1. For example, when the interior temperature of the vehicle 1 is high, the air conditioner drive unit 155 may operate the air conditioner to supply cold air to the interior of the vehicle 1.

The window drive unit 156 may perform electronic control of a window apparatus inside the vehicle 1. For example, the window drive unit 156 may control opening or closing of left and right windows of the vehicle 1.

The airbag drive unit 157 may perform electronic control of an airbag apparatus inside the vehicle 1. For example, the airbag drive unit 157 may control an airbag to be deployed in a dangerous situation.

The sunroof drive unit 158 may perform electronic control of a sunroof apparatus inside the vehicle 1. For example, the sunroof drive unit 158 may control opening or closing of a sunroof.

The wiper drive unit 159 may perform control of wipers 14a and 14b included in the vehicle 1. For example, the wiper drive unit 159 may perform electronic control with regard to, for example, the number of operations and the speed of operation of the window wipers in response to user input upon receiving the user input that directs operation of the wipers through the user input unit 124. In another example, the wiper drive unit 159 may judge the amount or strength of rainwater based on sensing signals of a rain sensor included in the sensing unit 160 so as to automatically operate the wipers without user input.

In addition, the vehicle drive unit 150 may further include a suspension drive unit. The suspension drive unit may perform electronic control of a suspension apparatus inside the vehicle 1. For example, in the situation where the road surface is uneven, the suspension drive unit may control the suspension apparatus to reduce vibration of the vehicle 1.

The memory 130 is electrically connected to the controller 170. The memory 130 may store basic data for each unit, control data for operation control of the unit, and input/output data. The memory 130 may be any of various storage devices such as, for example, a ROM, a RAM, an EPROM, a flash drive, and a hard drive. The memory 130 may store various data for overall operation of the vehicle 1 such as, for example, programs for processing or control of the controller 170.

The interface unit 180 may serve as a passage for various kinds of external devices that are connected to the vehicle 1. For example, the interface unit 180 may have a port that is connectable to a mobile terminal and may be connected to the mobile terminal via the port. In this instance, the interface unit 180 may exchange data with the mobile terminal.

The controller 170 may control overall operation of each unit inside the vehicle 1. The controller 170 may be referred to as an Electronic Control Unit (ECU).

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for implementation of other functions.

The power supply unit 190 may supply power required to operate the respective components under the control of the controller 170. In particular, the power supply unit 190 may receive power from, for example, a battery inside the vehicle 1.

The controller 170 may receive navigation information from the communication unit 110. Here, the navigation information may include set destination information, destination based routing information, and map information or vehicle location information related to vehicle traveling.

In addition, some of the components illustrated in FIG. 1 may not be necessary to implement the vehicle 1. Accordingly, the vehicle 1 described in the present specification may include a greater or smaller number of components than those mentioned above.

Figure 2:
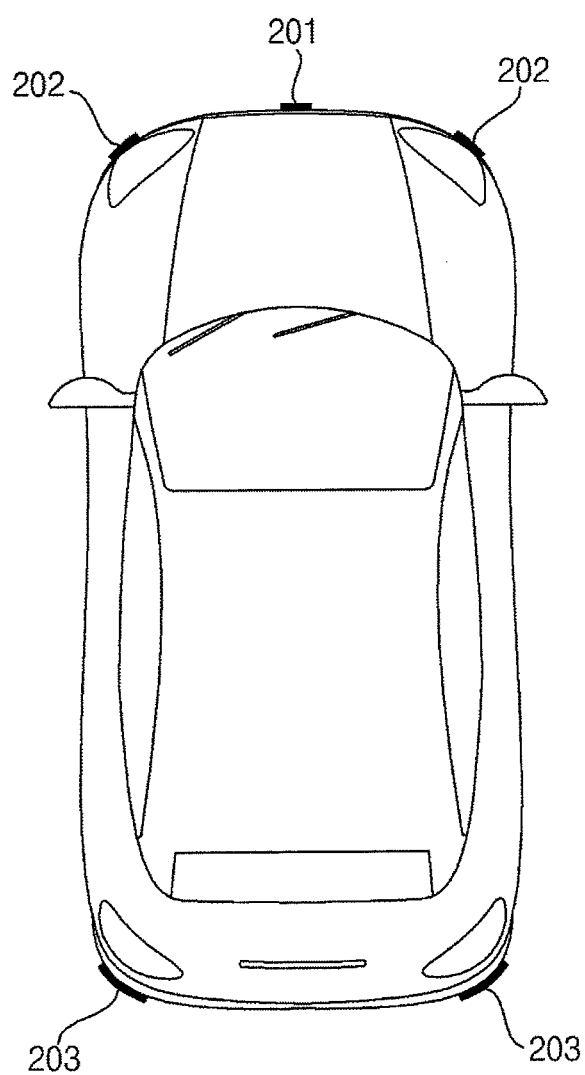
FIG. 2 is a view illustrating one exemplary vehicle with reference to FIG. 1 according to an embodiment of the present invention.

FIG. 2 is a view illustrating one exemplary vehicle with reference to FIG. 1. For convenience of description, the vehicle 1 is assumed to be a four-wheeled car.

Referring to FIG. 2, the vehicle 1 may include at least one radar 201, lidar 202, and ultrasonic sensor 203.

The radar 201 may be mounted at one side of the vehicle 1 and serve to emit electromagnetic waves to the vicinity of the vehicle 1 and to receive the electromagnetic waves reflected from a variety of objects that are present in the vicinity of the vehicle 1. For example, the radar 201 may acquire information related to, for example, the distance, direction, and height of any one object by measuring the time taken until the electromagnetic waves reflected by the corresponding object return thereto.

The lidar 202 may be mounted at one side of the vehicle 1 and serve to emit laser light in the vicinity of the vehicle 1. The laser, emitted by the lidar 202, may be scattered or reflected to thereby return to the vehicle 1. The lidar 202 may acquire information related to physical properties such as, for example, the distance, speed, and shape of a target, which is located in the vicinity of the vehicle 1, based on the time taken until the laser returns, the strength of the laser light, variation in frequency, and variation in polarization.

The ultrasonic sensor 203 may be mounted at one side of the vehicle 1 and serve to generate ultrasonic waves in the vicinity of the vehicle 1. The ultrasonic waves, generated by the ultrasonic sensor 203, have properties of a high frequency (approx. 20 KHz or higher) and short wavelength. The ultrasonic sensor 203 may be mainly used to recognize, for example, an obstacle close to the vehicle 1.

The radar 201, the lidar 202, and the ultrasonic sensor 203, illustrated in FIG. 2, may be sensors included in the sensing unit 160 illustrated in FIG. 1.

Figure 3:
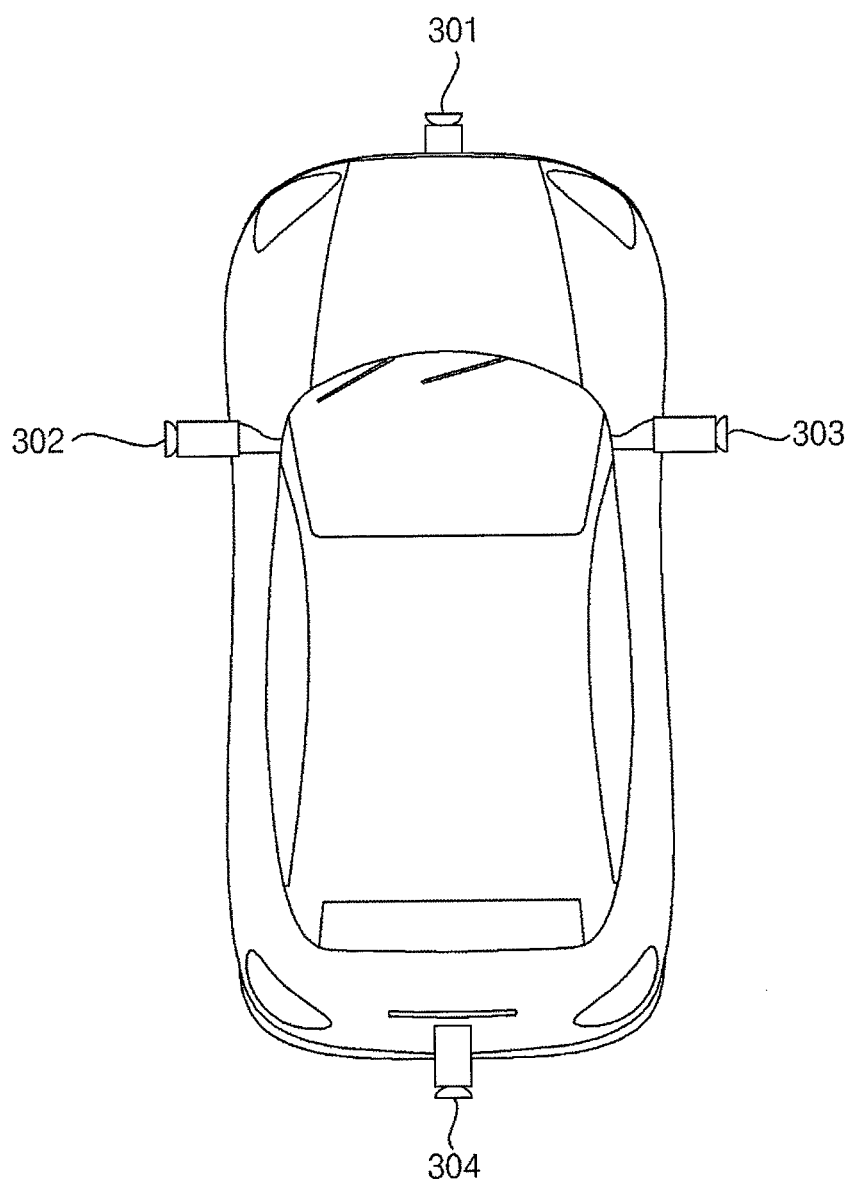
FIG. 3 is a view illustrating another exemplary vehicle with reference to FIG. 1 according to an embodiment of the present invention.

FIG. 3 is a view illustrating another exemplary vehicle 1 with reference to FIG. 1. For convenience of description, the vehicle 1 is assumed to be a four-wheeled car.

Referring to FIG. 3, four cameras 301, 302, 303, and 304 may be mounted at different positions on the exterior of the vehicle 1.

The cameras 301, 302, 303, and 304 may be respectively located at the front side, the left side, the right side, and the rear side of the vehicle 1. Each of the cameras 301, 302, 303, and 304 may correspond to the camera 161 illustrated in FIG. 1.

The front camera 301 may be located near a windshield, near an emblem, or near a radiator grill.

The left camera 302 may be located inside a case enclosing a left side-view mirror. Alternatively, the left camera 302 may be located at the exterior of the case enclosing the left side-view mirror. Alternatively, the left camera 302 may be located at a region of the exterior of a left front door, a left rear door, or a left fender.

The right camera 303 may be located inside a case enclosing a right side-view mirror. Alternatively, the right camera 303 may be located at the exterior of the case enclosing the right side-view mirror. Alternatively, the right camera 303 may be located at a region at the exterior of a right front door, a right rear door, or a right fender.

In addition, the rear camera 304 may be located near a rear license plate or a trunk switch.

Respective images captured by the cameras 301, 302, 303, and 304 may be transmitted to the processor 570, and the processor 570 may compose the respective images to generate a surround-view image of the vehicle 1.

Further, each of the cameras 301, 302, 303, and 304 illustrated in FIG. 3 may be the same as the camera 161 of the sensing unit 160 illustrated in FIG. 1.

In addition, although FIG. 3 illustrates the vehicle 1 as including four cameras mounted to the exterior thereof, note that the present invention is not limited as to the number of cameras, and that a greater or smaller number of cameras than those mentioned above may be mounted at different positions from the positions illustrated in FIG. 3.

Figure 4:
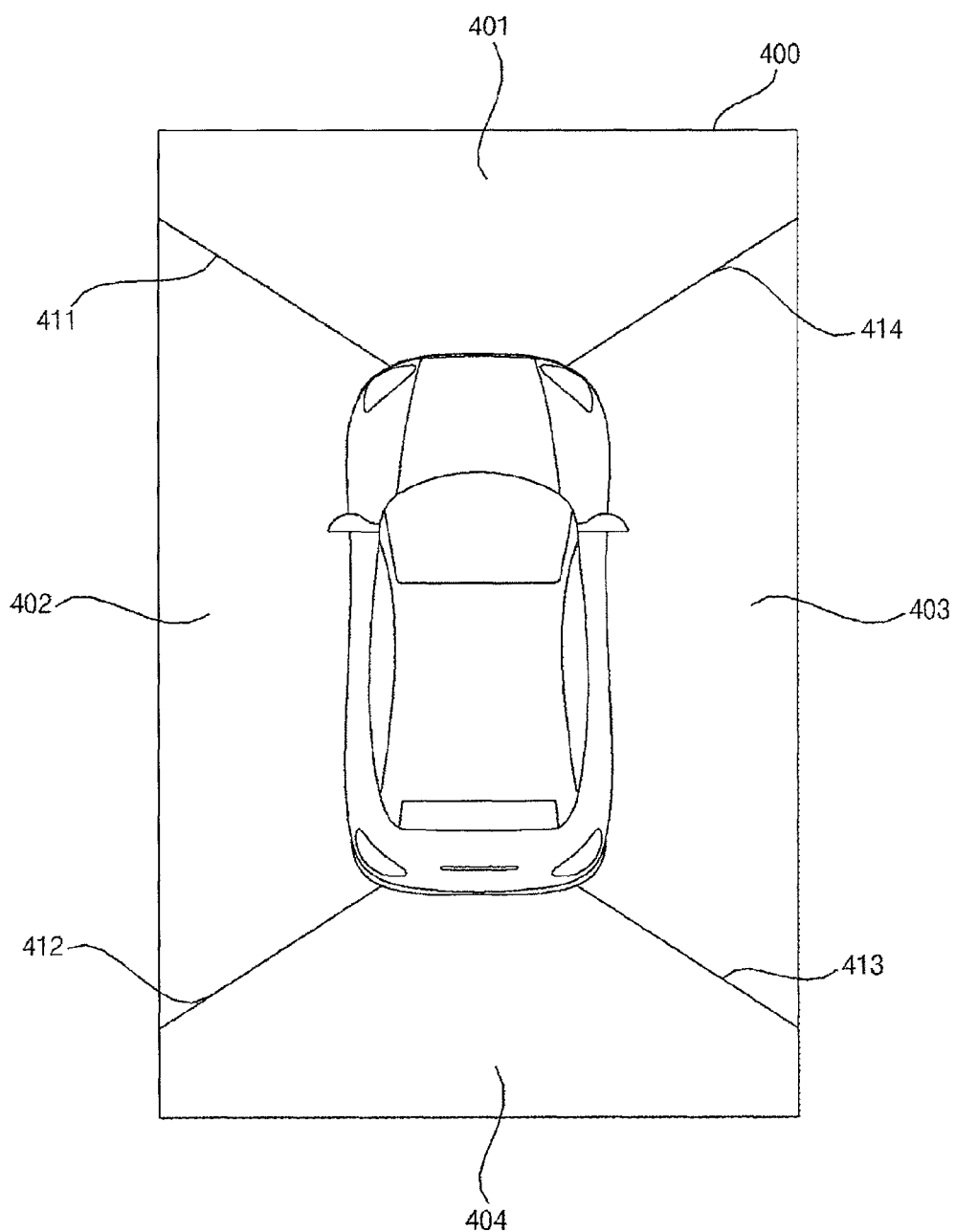
FIG. 4 is a view illustrating one exemplary image generated by a plurality of cameras illustrated in FIG. 3 according to an embodiment of the present invention.

FIG. 4 is a view illustrating one exemplary image generated by the cameras 301, 302, 303, and 304 illustrated in FIG. 3.

Referring to FIG. 4, a composite image 400 may include a first image region 401 captured by the front camera 301, a second image region 402 captured by the left camera 302, a third image region 403 captured by the right camera 303, and a fourth image region 404 captured by the rear camera 304. The composite image 400 may be called an around view monitoring image.

Meanwhile, upon generation of the composite image 400, boundary lines 411, 412, 413, and 414 are generated between two respective images included in the composite image 400. These boundaries may be subjected to image blending, for natural display thereof.

Further, the boundary lines 411, 412, 413 and 414 may be displayed at the boundaries between the respective images. In addition, the composite image 400 may include a predetermined image, indicating the vehicle 1, at the center thereof.

In addition, the composite image 400 may be displayed via a display device mounted in the space inside the vehicle 1.

Figure 5:
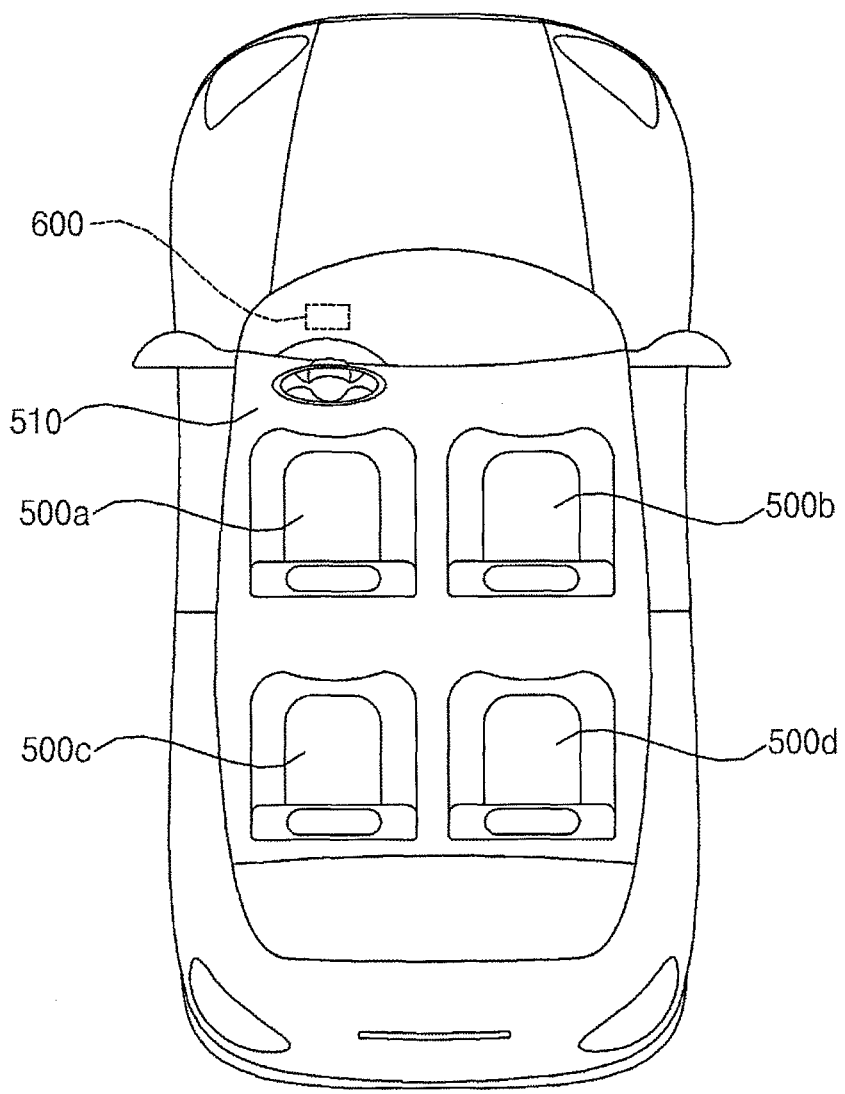
FIG. 5 is a view illustrating still another exemplary vehicle with reference to FIG. 1 according to an embodiment of the present invention.

FIG. 5 is a view illustrating still another exemplary vehicle 1 with reference to FIG. 1 according to an embodiment of the present invention. To aid in understanding the vehicle 1, the roof of the vehicle 1 is omitted in FIG. 5.

Referring to FIG. 5, the vehicle 1 includes a passenger compartment 510 in which at least one person can be accommodated. The passenger compartment 510 may be equipped with one driver seat 500*a* and a plurality of passenger seats 500*b*, 500*c*, and 500*d*. Specifically, the driver seat 500*a* and the passenger seat 500*b* may be located in the first row of the passenger compartment 510 and the other passenger seats 500*c* and 500*d* may be located in the second row of the passenger compartment 510. A driver may sit on the driver seat 500*a* and passengers may sit on the passenger seats 500*b*, 500*c*, and 500*d*.

Although only three passenger seats 500*b*, 500*c*, and 500*d* are illustrated in FIG. 5, this is purely exemplary and it should be appreciated that fewer or more seats may be mounted in the passenger compartment 510 according to the size or type of the vehicle 1.

The portable device control apparatus 600, which will be described later, may be arranged at one side of the vehicle 1. For example, the portable device control apparatus 600 may be placed on a dashboard or on the inward side of the dashboard as illustrated in FIG. 5. In this instance, the portable device control apparatus 600 may be located near the driver seat 500*a*. That is, the distance between one of the multiple passenger seats 500b, 500c, and 500d and the portable device control apparatus 600 may be farther than the distance between the driver seat 500a and the portable device control apparatus 600.

Figure 6:
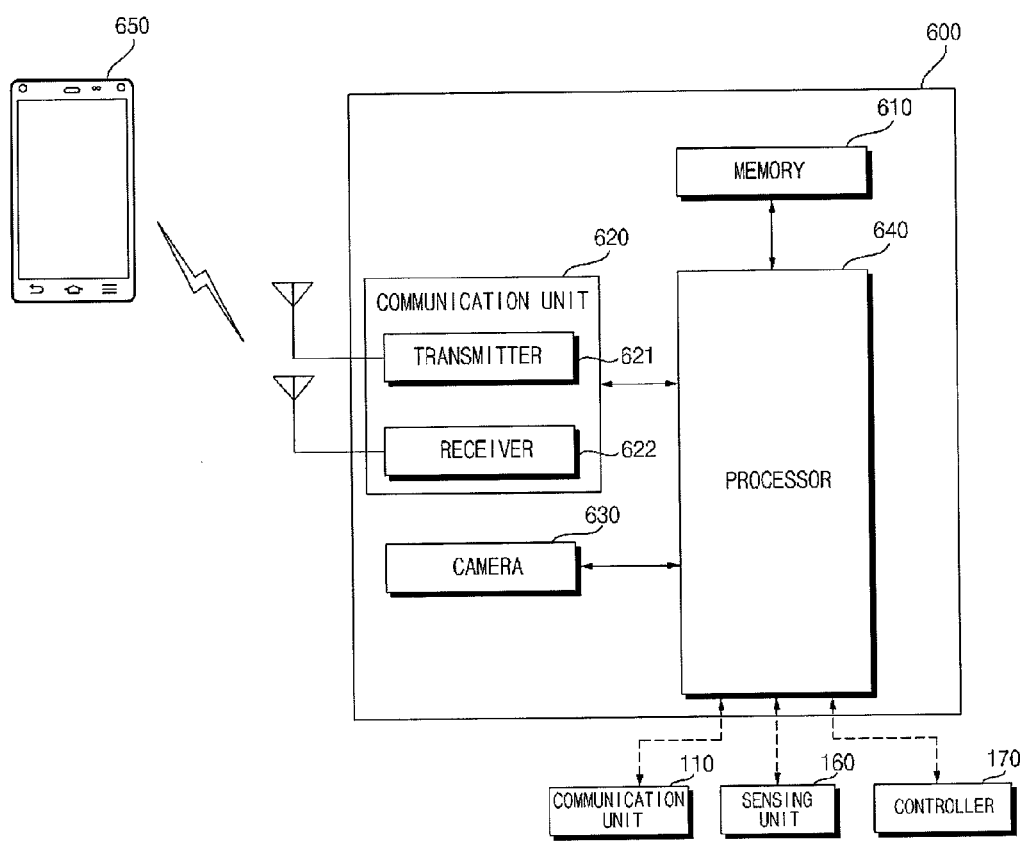
FIG. 6 illustrates a portable device control apparatus according to an embodiment of the present invention.

FIG. 6 illustrates the portable device control apparatus 600 according to an embodiment of the present invention.

Referring to FIG. 6, the portable device control apparatus 600 may include a memory 610, a communication unit 620, a camera 630, and a processor 640. It is noted that some elements illustrated in FIG. 6 may be omitted or new elements may further be included in FIG. 6 according to some embodiments.

The memory 610 may store at least one program capable of being executed by the processor 640. In addition, the memory 610 may store various types of data that is searched, manipulated, changed, or stored by the processor 640. The data stored in the memory 610 may include various pieces of information for processing or controlling overall operation of the portable device control apparatus 600.

The memory 610 may store data which is to be used to determine a region in which a portable device 650 is positioned in the passenger compartment 510 of the vehicle 1. As an example, if the passenger compartment 510 of the vehicle 1 is partitioned into a plurality of regions, the regions may be distinguished from each other by the ranges of signal strength levels corresponding to the regions. The range of a signal strength level corresponding to any one region in the passenger compartment 510 of the vehicle 1 may be stored in the memory 610 in the manner of not overlapping with the range of a signal strength level corresponding to another region. As such, the processor 640 may determine one region in which the portable device 650 is positioned according to signal strength measured by the portable device 650 with reference to the data stored in the memory 610.

The memory 610 may store data for identifying the portable device 650 located in the vehicle 1. For example, the memory 610 may store information for judging whether the portable device 650 connected wirelessly to the communication unit 620 is a registered device or not.

The memory 610 may store data for identifying passengers (e.g., a driver and other passengers) in the vehicle 1. For example, the memory 610 may store reference images corresponding to a plurality of pre-registered users. The processor 640, which will be described later, may compare a reference image per user stored in the memory 610 with an interior image of the vehicle to identify a passenger corresponding to the interior image of the vehicle 1.

The memory 610 may be one of various devices such as a ROM, a RAM, an EPROM, a flash drive, a hard drive, etc. as hardware.

The communication unit 620 may be connected to at least one of portable devices, for example, the portable device 650, positioned in the vehicle 1 to wirelessly exchange data. A wireless data communication scheme includes a variety of data communication schemes such as Bluetooth, Wi-Fi Direct, Wi-Fi, APiX, and NFC.

In addition, when a passenger is present in the vehicle 1, the portable device 650 of the passenger may be paired with the communication unit 620 automatically or at the request of the passenger.

The communication unit 620 may measure the strength of a radio signal transmitted from the portable device 650 positioned in the vehicle 1. The portable device 650 may measure the strength of a radio signal transmitted from the communication unit 620 as well.

Specifically, the communication unit 620 includes at least one transmitter 621 and at least one receiver 622. The transmitter 621 is installed at one side inside the vehicle 1 to transmit a detection signal to the portable device 650 positioned inside the vehicle 1. As an example, the transmitter 621 may be arranged at one side of a roof of the vehicle 1. The detection signal is used to detect whether the portable device 650 is within a predetermined limited region inside the vehicle 1. The limited region may indicate a three-dimensional space which is predetermined to deactivate execution of at least one function of the portable device 650. The limited region may include at least part of the driver seat 500. If the detection signal is transmitted, the receiver 622 waits for the portable device 650 to transmit a response signal. The response signal is a radio signal transmitted by the portable device 650 as a response to the detection signal. The portable device 650 measures the strength of the detection signal received thereby and transmits the response signal including the measured signal strength to the communication unit 620.

The camera 630 generates interior images of the vehicle 1 and provides the images to the processor 640. The camera 630 may be mounted at one side inside the vehicle 1.

In this instance, at least one camera 630 may be installed in the first row of the passenger compartment 510. If the camera 630 is installed in the first row of the passenger compartment 510, the camera 630 may generate interior images of the driver seat 500 and the passenger seat 500b. In addition, the camera 630 may be further installed in the second row of the passenger compartment 510. If the camera 630 is installed in the second row of the passenger compartment 510, the camera 630 may generate interior images of the other passenger seats 500c and 500d.

The processor 640 controls an overall operation of the portable device control apparatus 600.

The processor 640 may process interior images acquired by the camera 630. The processor 640 performs computer vision based signal processing. Then, the processor 640 may acquire interior images of the vehicle 1 from the camera 630 and perform object detection and object tracking based on the interior images. For example, the processor 640 may perform facial recognition, gesture recognition, and eye tracking of the interior images.

The processor 640 may compare an object detected from the interior images with data stored in the memory 610 to acquire detailed information about the detected object and control operation of the portable device 650 based on the acquired detailed information. For example, the processor 640 may detect the face image of a passenger seated in a passenger seat from the interior images and compare the detected face image of the passenger with reference images stored in the memory 610 to thereby determine an identity of the passenger.

The processor 640 may be connected to the communication unit 110 of the vehicle 1 wirelessly or by wire to thereby receive information about the state of the vehicle 1 or information about a surrounding environment of the vehicle 1 from the communication unit 110. For example, the processor 640 may receive a current location of the vehicle 1 from the communication unit 110. In this instance, the processor 640 may determine the type of a road on which the vehicle 1 is currently located based on an electronic map stored in the memory 610. The electronic map may be stored in the memory 130 of the vehicle 1 as well. As another example, the processor 640 may receive information about weather of a region in which the vehicle 1 is currently located from the communication unit 110.

In addition, the processor 640 is coupled to the sensing unit 160 of the vehicle 1 wirelessly or by wire to receive at least one sensing signal from the sensing unit 160. For example, the processor 640 may receive information about the state of the vehicle 1 (e.g., velocity, direction, and/or the amount of remaining fuel) from the sensing unit 160. As another example, the processor 640 may receive information about a surrounding environment of the vehicle 1 (e.g., obstacles) from the sensing unit 160.

Further, the processor 640 may be coupled to the controller 170 wirelessly or by wire to receive various commands from the controller 170 or to operate according to the received commands.

Although only one portable device 650 is illustrated in FIG. 6, it is apparent to those skilled in the art that the present invention is not limited thereto and two or more portable devices 650 may be wirelessly connected to the communication unit 620.

Figure 7B:
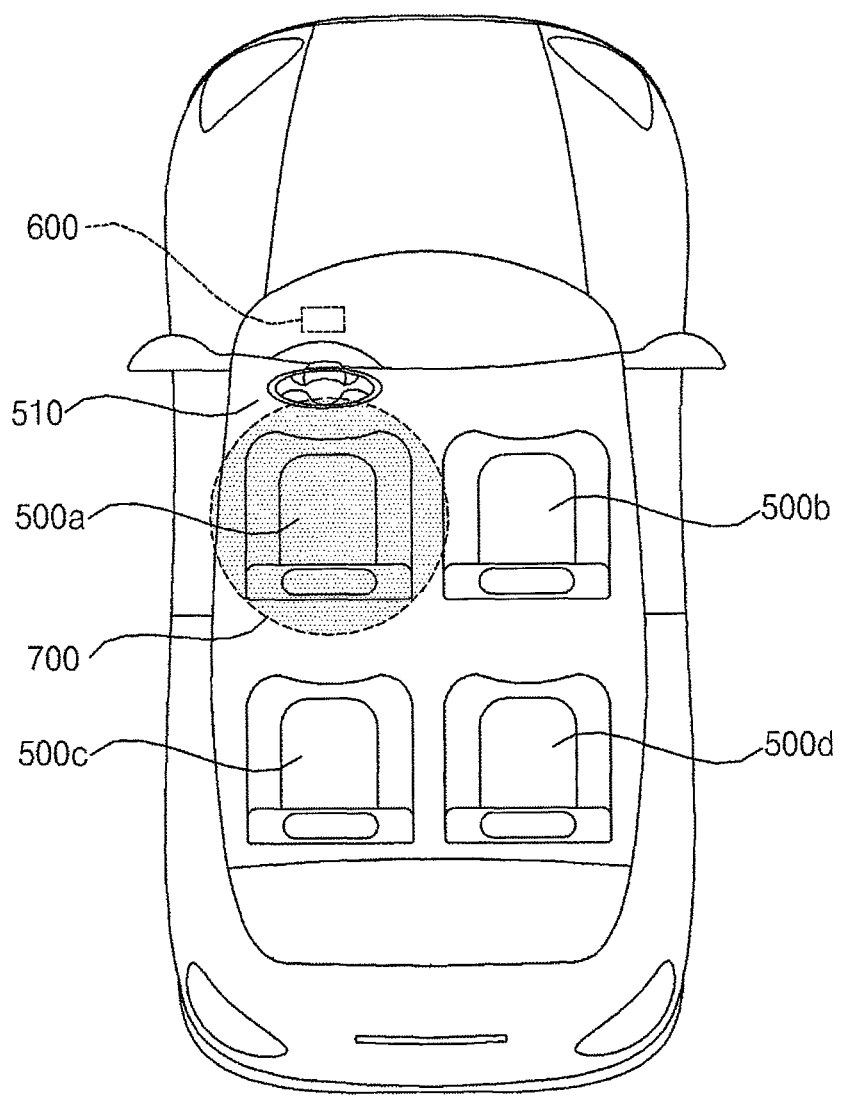

FIGS. 7A and 7B illustrate a limited region 700 determined with respect to the passenger compartment 510 illustrated in FIG. 5.

Referring to FIG. 7A, the transmitter 621 of the communication unit 620 may be located near the driver seat 500a among regions of the roof of the vehicle 1. For example, the transmitter 621 may be installed at a point at which a central vertical axis of the driver seat 500 and the roof meet. As described above, the limited region 700 is determined to prevent a driver from using a portable device. Accordingly, as illustrated in FIG. 7A, the transmitter 621 may be installed at a region far from the passenger seats 500b, 500c, or 500d and near the driver seat 500.

FIG. 7B illustrates the limited region 700 determined when the transmitter 621 is arranged as illustrated FIG. 7A. As shown, the limited region 700 may be determined as a region including at least part of the driver seat 500. The transmitter 621 is installed near the driver seat 500 and thus the strength of a detection signal transmitted from the transmitter 621 is higher in the driver seat 500a than in the passenger seats 500b, 500c, and 500d. Therefore, the strength of a detection signal measured when the portable device 650 is within the limited region 700 is higher than the strength of a detection signal measured when the portable device 650 is outside of the limited region 700.

The range of signal strength corresponding to the limited region 700 is pre-stored in the memory 610. Accordingly, the processor 640 may judge whether the portable device 650 is currently within the limited region 700 by comparing signal strength included in a response signal received from the portable device 650 within the limited region 700 with the range of signal strength stored in the memory 610.

Figure 8A:
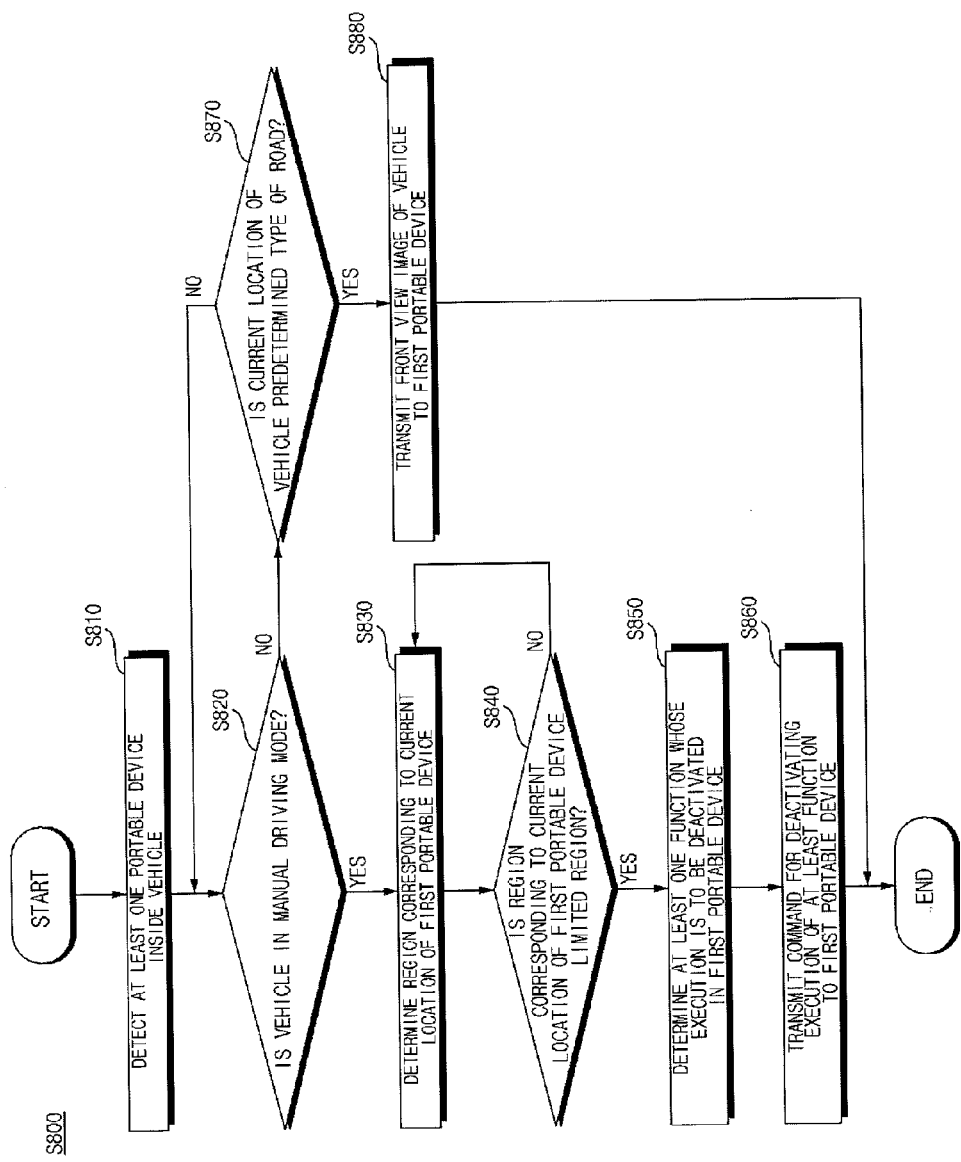
FIG. 8A is a flowchart of a process performed by a portable device control apparatus illustrated in FIG. 6 according to an embodiment of the present invention.

FIG. 8A is a flowchart of a process S800 performed by the portable device control apparatus 600 illustrated in FIG. 6 according to an embodiment of the present invention.

In step S810, the processor 640 detects at least one portable device 650 positioned inside the vehicle 1 through the communication unit 620. For example, the processor 640 may detect the presence of the portable device 650 positioned inside the vehicle 1 based on a radio signal that is transmitted from the portable device 650 and is received by the communication unit 620. The radio signal transmitted from the portable device 650 may include identification information of the portable device 650 (e.g., an identifier (ID), a model name, a telephone number, and/or a user of the portable device 650). If a plurality of portable devices is placed inside the vehicle 1, the processor 640 may distinguish any one portable device from the other portable devices based on identification information included in radio signals transmitted from the respective portable devices. In step S810, at least one portable device communicating with the processor 640 includes a first portable device and the at least one portable device communicating with the processor 640 can further include other portable devices according to some embodiments.

In step S820, the processor 640 may judge whether the vehicle 1 is in a manual driving mode (e.g., whether the user is driving the vehicle). If the vehicle 1 is in the manual driving mode, the processor 640 may perform step S830. Meanwhile, if the vehicle 1 is not in the manual driving mode, i.e., if the vehicle 1 is in an autonomous driving mode (e.g., self-driving mode), the processor 640 may perform step S870.

Figure 8B:
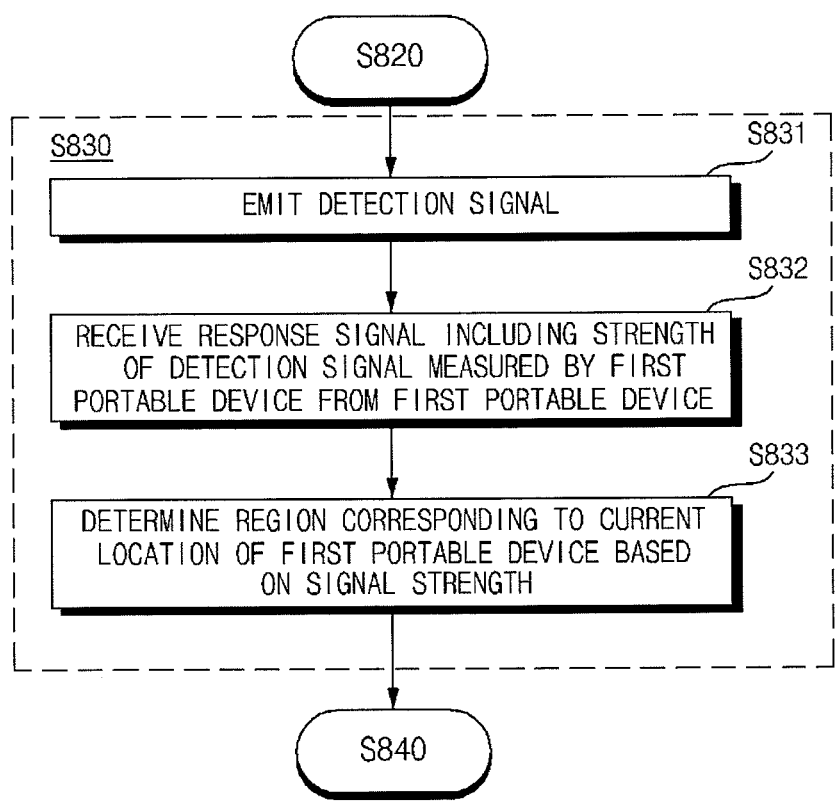
FIG. 8B illustrates an exemplary process related to FIG. 8A according to an embodiment of the present invention.

In step S830, the processor 640 may determine a region corresponding to a current location of the first portable device. FIG. 8B illustrates an exemplary process related to step S830. Referring to FIG. 8B, the processor 640 may emit, in step S831, a detection signal into the vehicle 1 through the communication unit 620. The detection signal may be transmitted to all portable devices including the first portable device positioned inside the vehicle 1 by the transmitter 621. Each of the portable devices inside the vehicle 1 may measure the strength of the detection signal. If the detection signal is emitted by the transmitter 621, the receiver 622 may wait for the portable devices to transmit response signals. In step S832, the processor 640 receives the response signals transmitted from all portable devices inside the vehicle 1 through the communication unit 620. Each response signal includes the strength of a detection signal, measured by a portable device that has transmitted the response signal. In step S833, the processor 640 determines a region corresponding to a current location of the at least first portable device among a plurality of regions included in the passenger compartment 510 based on the signal strength included in the response signal received from the first portable device. For example, if the passenger compartment 510 is partitioned into a limited region and a non-limited region, the processor 640 may judge whether the first portable device is currently within the limited region or the non-limited region. The non-limited region may be defined as the other region of the passenger compartment 510 except for the limited region.

In step S840, the processor 640 may judge whether a region corresponding to a current location of the first portable device is a predetermined limited region. If the current location of the first portable device is determined to be in the predetermined limited region, the processor 640 may perform step S850. If the current location of the first portable device is determined to be in a non-limited region, the processor 640 may return to step S830 or terminate the process S800.

In step S850, the processor 640 determines one or more functions whose execution is to be deactivated in the first portable device. In this instance, the processor 640 may determine at least one function whose execution is to be deactivated in the first portable device based on at least one of a past driving history of a driver currently seated in the driver seat 500, the state of the vehicle 1, and the surrounding environment of the vehicle 1. As an example, as the speed of the vehicle 1 increases, the processor 640 may increase the number of functions whose execution is to be deactivated in the first portable device. A past driving history of each driver may be stored in the memory 610 and the processor 640 may acquire a past driving history of a driver currently seated in the driver seat 500 from the memory 610.

In step S860, the processor 640 may transmit a command for deactivating execution of at least one function determined in step S850 to the first portable device through the communication unit 620. Upon receiving the command, the first portable device will deactivate execution of at least one function corresponding to the command among all functions of the first portable device. For instance, a function whose execution is deactivated in the first portable device by the command transmitted in step S860 may be a text message transmission and reception function. In this instance, execution of functions related to driving of the vehicle 1, such as a route search function (e.g., a GPS navigation application), may not be deactivated.

Meanwhile, in step S870, the processor 640 may judge whether the vehicle 1 is currently located on a predetermined type of road. The current location of the vehicle 1 may be provided from the communication unit 110. The processor 640 may acquire the type of road on which the vehicle 1 is currently located using an electronic map stored in the memory 610. As an example, the processor 640 may judge whether a road corresponding to the current location of the vehicle 1 is at least one of an expressway, a construction zone, a school zone, and a sharp curve area corresponding to the predetermined type of road based on a danger level.

Upon judging that the current location of the vehicle 1 corresponds to the predetermined type of road, the processor 640 may transmit a forward view image to the first portable device through the communication unit 620 in step S880. The forward view image of the vehicle 1 may be provided by the camera 161 illustrated in FIG. 1. Generally, in an autonomous driving mode, although a driver has less need for looking forward, the processor 640 may transmit the forward view image of the vehicle 1 to the first portable device on a type of road on which a driver needs to concentrate, such as an expressway, a construction zone, a school zone, and a sharp curve area, thereby reducing the probability of accident occurrence.

Figure 9B:
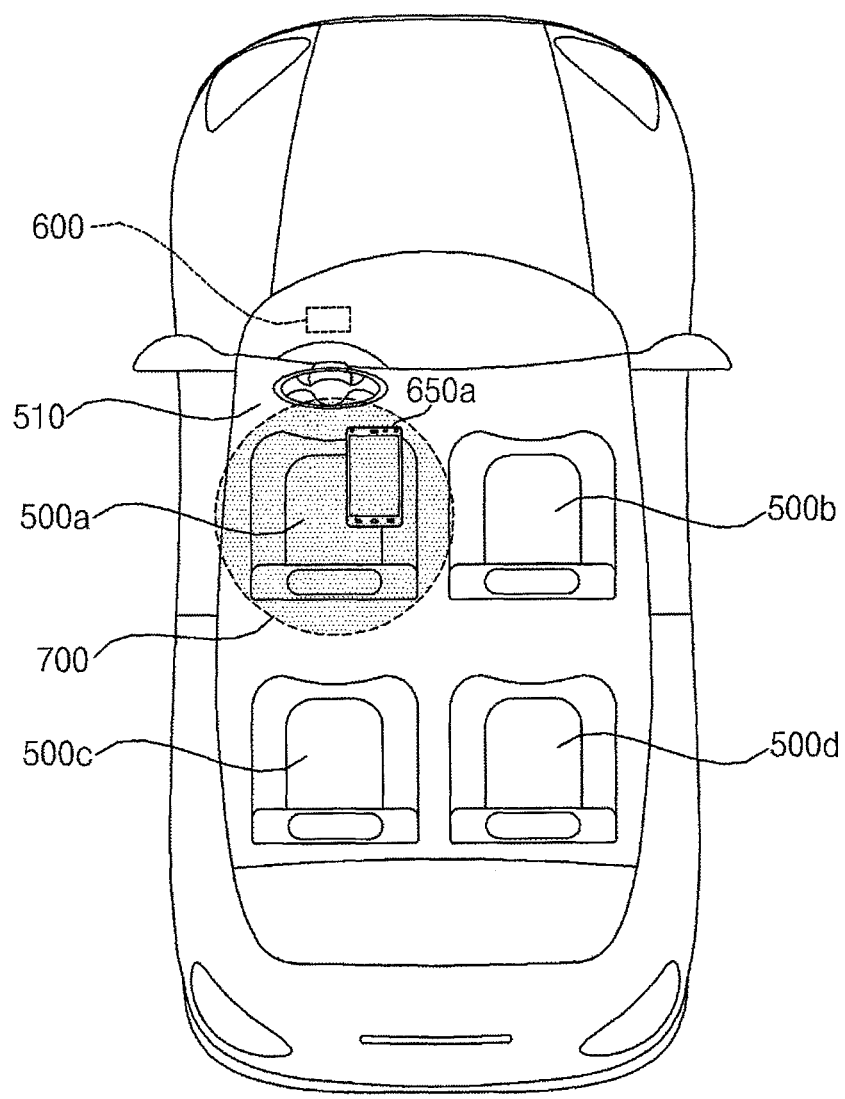

FIG. 9A illustrates an exemplary data structure 910 used to detect the location of a portable device in the vehicle 1. FIG. 9B illustrates the limited region 700 defined by the data structure 910 illustrated in FIG. 9A.

Referring to FIG. 9A, the memory 610 may store the data structure 910 and the data structure 910 may include a plurality of predetermined regions and a plurality of signal strength ranges related to the multiple regions.

The passenger compartment 510 may be partitioned into the limited region 700 and a non-limited region by the data structure 910 illustrated in FIG. 9A. Specifically, the limited region 700 and the non-limited region may be defined by two signal strength ranges as illustrated in FIG. 9A.

The processor 640 may compare the strength of a detection signal, measured by a first portable device 650a in the vehicle 1, with the two signal strength ranges illustrated in FIG. 9A.

A detection signal transmitted by the transmitter 621 is received by the first portable device 650a and the first portable device 650a measures the strength of the received detection signal. If the first portable device 650a is located at a boundary of the limited region 700, the strength of the detection signal, measured by the first portable device, will be equal to a threshold value. If the first portable device 650a is currently within the limited region 700, the strength of the detection signal, measured by the first portable device 650a, will be greater than or equal to the threshold value included in the data structure 910 for limited region determination, as illustrated in FIG. 9A. The first portable device 650a may transmit a response signal including the strength of the detection signal, measured thereby, and the receiver 622 may receive the response signal from the first portable device 650a.

The processor 640 may receive the response signal from the receiver 622, compare the strength of the detection signal included in the received response signal with the two ranges determined by the data structure 910 for limited region determination, and judge which one of the limited region 700 and the non-limited region is a region corresponding to the current location of the first portable device 650a.

As illustrated in FIG. 9B, since the strength of the detection signal, measured by the first portable device 650a within the limited region 700, will exceed the threshold value, the processor 640 may judge that the first portable device 650a is currently within the limited region 700. Then, the processor 640 may transmit a command for deactivating execution of at least one function of the first portable device 650a to the first portable device 650a through the communication unit 620.

Figure 9C:
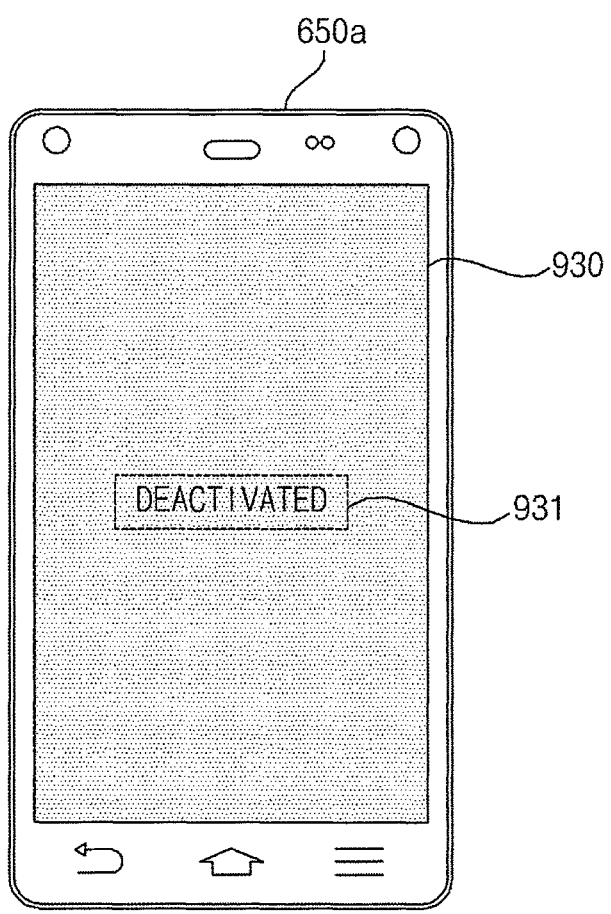
FIGS. 9C and 9D illustrate operation of a first portable device illustrated in FIG. 9B according to an embodiment of the present invention.
Figure 9D:
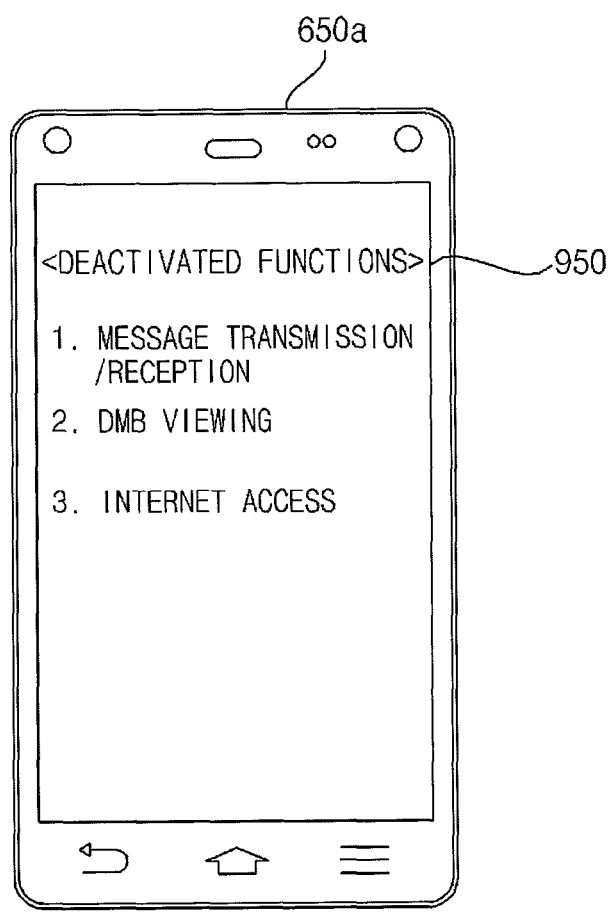

FIGS. 9C and 9D illustrate operation of the first portable device 650a illustrated in FIG. 9B.

FIG. 9C illustrates a screen 930 displayed on a display of the first portable device 650a when the processor 640 transmits a command for deactivating execution of all functions of the first portable device 650a. Execution of all functions of the first portable device 650a may be deactivated according to the command received from the communication unit 620. In this instance, a message 931 indicating that execution of all functions of the first portable device 650a has been deactivated (e.g., "DEACTIVATED") may be displayed in the screen 930.

FIG. 9D illustrates a screen 950 displayed on the display of the first portable device 650a when the processor 640 transmits a command for deactivating execution of some functions of the first portable device 650a. For example, execution of a message transmission/reception function, a Digital Multimedia Broadcasting (DMB) viewing function, and an Internet access function of the first portable device 650a may be deactivated by the processor 640. In this instance, a message containing a list of at least one function whose execution is deactivated may be displayed in the screen 950.

FIG. 9E illustrates exemplary data structures 960, 970, and 980 used to determine a function whose execution is deactivated in a portable device within the limited region 700. For convenience of description, it is assumed that the first portable device 950a is located within the limited region 700 as illustrated in FIG. 9B.

Referring to FIG. 9E, a memory may store at least one of the data structure 960 including functions related to the state of a vehicle, the data structure 970 including functions related to a surrounding environment of a vehicle, and the data structure 980 including functions related to a past driving history of a driver.

The processor 640 may select, using the data structure 960, functions of the first portable device 650a whose execution should be deactivated at a current speed of the vehicle. For example, if the current speed of the vehicle 1 is 20 km/h, execution of a message transmission function of the first portable device 650a may be deactivated by the processor 640. In the data structure 960, as the speed of the vehicle 1 increases, execution of more functions may be deactivated by the processor 640. In addition, although only the speed of the vehicle 1 is included as the state of the vehicle in the data structure 960, all information related to the state of the vehicle, such as the heading of the vehicle, may be used to determine functions whose execution should be deactivated in the first portable device 650a.

The processor 640 may select, using the data structure 970, functions of the first portable device 650a whose execution should be deactivated for a road on which the vehicle 1 is currently located. For example, if the current location of the vehicle 1 is a school zone, execution of a message transmission function and a message composition function of the first portable device 650a may be deactivated by the processor 640. In addition, although only a road is included as the surrounding environment of the vehicle in the data structure 970, all information related to the surrounding environment of the vehicle, such as weather, may be used to determine functions whose execution should be deactivated in the first portable device 650a.

The processor 640 may select, using the data structure 980, functions of the first portable device 650a whose execution should be deactivated when the current location of the vehicle 1 corresponds to a location included in a past driving history of a driver. For example, when the vehicle 1 approaches a location A where the driver caused an accident, execution of a message transmission function, a message composition function, and an information display function of the first portable device 650a may be deactivated by the processor 640. As another example, if the vehicle 1 approaches a location B where the driver deviated from a given route, execution of a message transmission function and a music playback function of the first portable device 650a may be deactivated by the processor 640.

Figure 10:
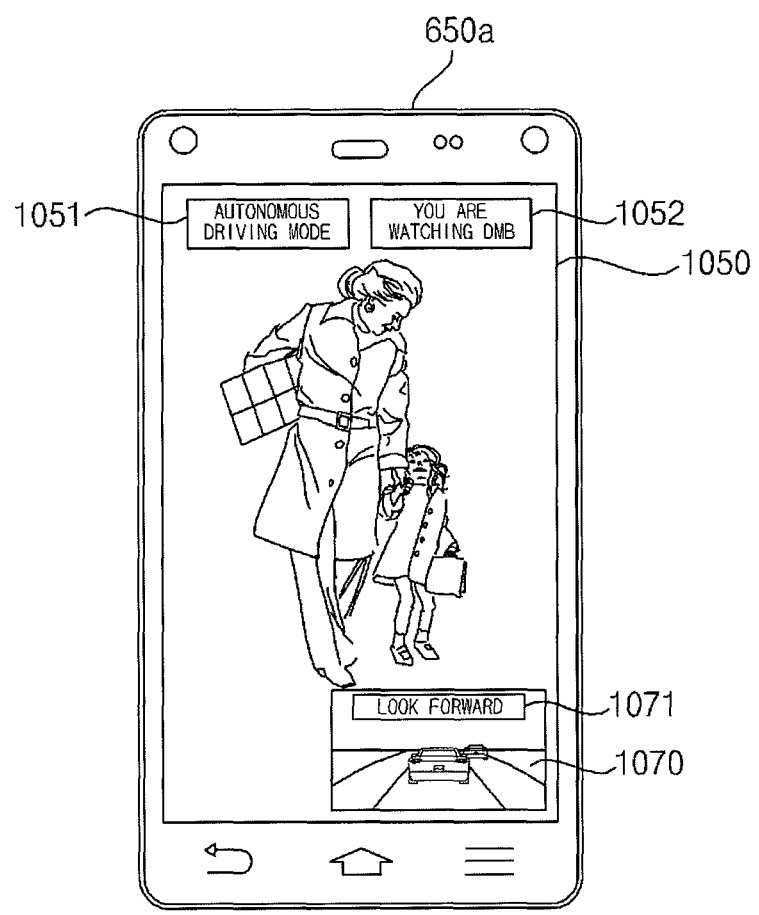
FIG. 10 illustrates an exemplary operation of a first portable device when a vehicle 1 illustrated in FIG. 9B is in an autonomous driving mode according to an embodiment of the present invention.

FIG. 10 illustrates an exemplary operation of the first portable device 650a when the vehicle 1 illustrated in FIG. 9B is in an autonomous driving mode (e.g., self-driving mode).

Referring to FIG. 10, when the vehicle 1 is in an autonomous driving mode, the processor 640 may not deactivate execution of any function of the first portable device 650a even when the first portable device 650a is within the limited region 700 as described with reference to FIG. 8A. For example, when the vehicle 1 is in a manual driving mode, the processor 640 may transmit a command for deactivating execution of at least one function of the first portable device 650a and, when the vehicle 1 is switched to the autonomous driving mode from the manual driving mode, the processor may stop transmitting the command.

Then, as illustrated in FIG. 10, when the vehicle 1 is in an autonomous driving mode, the user of the first portable device 650a may activate a DMB viewing function so that a DMB screen 1050 may be displayed on a display of the first portable device. In this instance, an indicator 1051 indicating that the vehicle 1 is currently in an autonomous driving mode and an indicator 1052 representing a currently executed function may be displayed in the screen 1050.

In addition, if the current location of the vehicle 1 is a predetermined type of road, the processor 640 may transmit a forward view image of the vehicle 1 provided from the camera 161 to the first portable device 650a. The predetermined type of road may be a predetermined road where concentration of a driver is needed and may include, for example, a sharp curve area, a crossroad, a school zone, an expressway, and a construction zone.

As the processor 640 transmits the forward view image of the vehicle 1 to the first portable device 650a, a forward view image 1070 of the vehicle 1 may be displayed on one region of the display of the first portable device 650a as illustrated in FIG. 10. In addition, a message 1071 urging the driver to look forward may be displayed on one side of the display of the first portable device 650a.

As such, the probability of an unexpected accident occurring may be greatly reduced even while operating in the autonomous driving mode in which the driver may not be paying close attention to the road.

Figure 11:
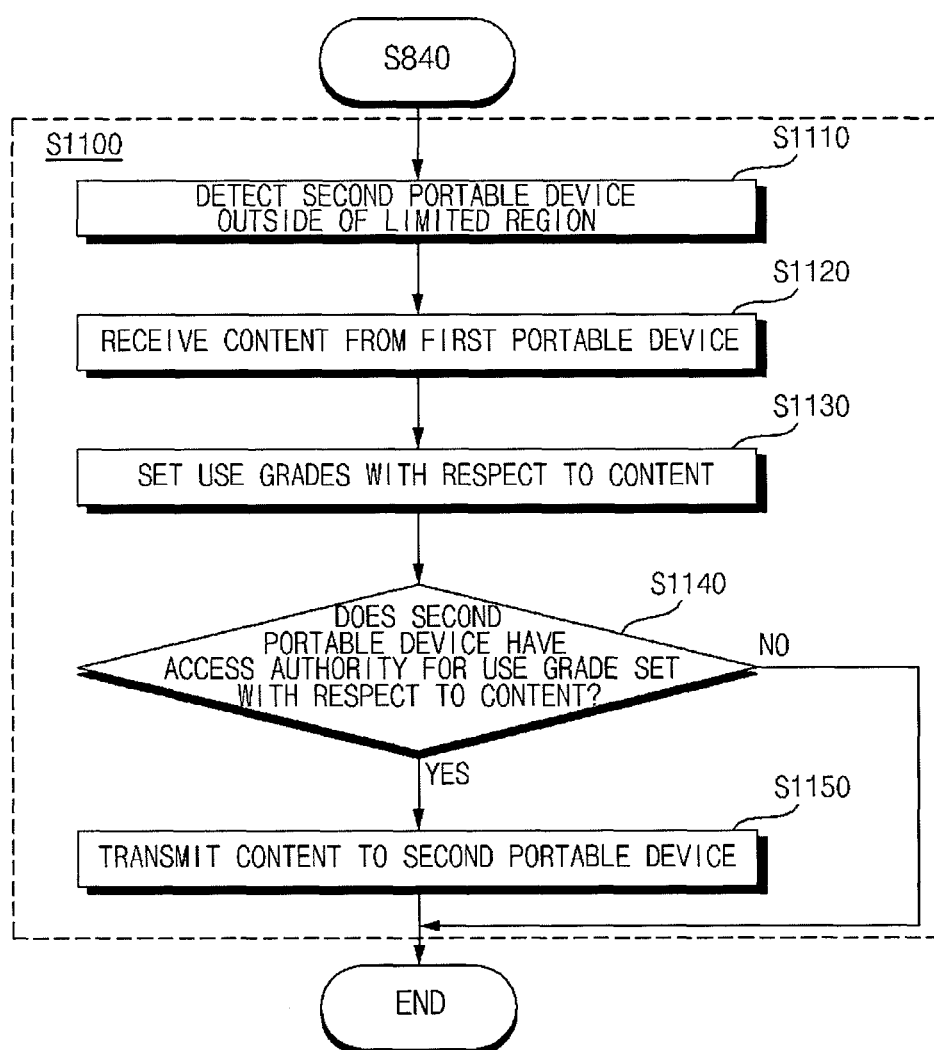
FIG. 11 is a flowchart of another process performed by the portable device control apparatus illustrated in FIG. 6 according to an embodiment of the present invention.

FIG. 11 is a flowchart of another process S1100 performed by the portable device control apparatus 600 illustrated in FIG. 6 according to an embodiment of the present invention.

In step S1110, the processor 640 may detect a second portable device (refer to 650b of FIG. 12) located outside of the limited region 700 among one or more devices detected in step S810. Specifically, if the current location of the first portable device 650a is within the limited region 700 in step S840, the processor 640 may detect the second portable device 650b that is positioned outside of the limited region 700 among the one or more portable devices detected in step S810. As an example, the processor 640 may detect the second portable device 650b positioned outside of the limited region 700 using a scheme related to step S830 and step S840 described with reference to FIGS. 8A and 9A.

In step S1120, the processor 640 receives content stored in the first portable device 650a from the first portable device 650a through the communication unit 620. The first portable device 650a may pre-store various types of content, such as text messages, voice messages, SNS messages, diaries, music, videos, films, private information (e.g., names, addresses, and offices), and photos, which are composed by a user, received from an external device, or downloaded, and one or more types of content thereamong may be transmitted to the communication unit 620. In step S1120, the communication unit 620 may receive all or some types of content stored in the first portable device 650a.

The processor 640 may recognize the voice of a driver through the microphone 123 and identify content indicated by the recognized voice. For example, if the driver says "Message check", the processor 640 may receive only messages among the multiple types of content stored in the first portable device 650a through the communication unit 620. In this instance, the processor 640 may receive only content recognized based on voice from the first portable device 650a.

In step S1130, the processor 640 may set at least one of a plurality of predetermined use grades with respect to content received in step S1120. The use grades may be used to permit only a specific portable device or user to access content stored in the first portable device 650a.

The processor 640 may set any one of a plurality of predefined use grades with respect to content received in step S1120. For example, content types and data defining use grades corresponding to the content types may be stored in the memory 610. Specifically, content set as a first use grade may be permitted to be accessed by the user of the first portable device 650a and family members of the user of the first portable device 6501. Content set as a second use grade may be permitted to be accessed by the user of the first portable device 650a and friends of the user of the first portable device 650a. Content set as a third use grade may be permitted to be accessed by everybody and content set as a fourth use grade may be permitted to be accessed only by the user of the first portable device 650a.

The processor 640 may also set the use grades according to the contents of received content. The processor 640 may set the use grades based on the contents of private information included in content received from the first portable device 650a.

In step S1140, the processor 640 judges whether the second portable device 650b has access authority for a use grade set with respect to content received from the first portable device 650*a*. In more detail, the processor 640 may receive identification information of the second portable device 650*b* from the second portable device 650*b* as described with reference to step S810. Next, the processor 640 may judge whether to permit the second portable device 650*b* to access the content received from the first portable device 650*a* based on the identification information of the second portable device 650*b*. For example, an ID of each portable device and data in which access authority of each portable device corresponding to the ID is defined may be stored in the memory 610. The processor 640 may acquire access authority assigned to the ID of the second portable device 650*b* from the memory 610 and confirm whether the acquired access authority matches a use grade set with respect to the content received from the first portable device 650*a*. Which access authority is assigned to each portable device may be determined by the user of the first portable device 650*a*. For example, before the process S1100 is started, a user interface may be provided to the user of the first portable device 650*a* so that the user may set access authority per portable device.

Upon judging that the second portable device 650*b* has access authority for a use grade set with respect to the content received from the first portable device 650*a*, the processor 640 transmits the content received from the first portable device 650*a* to the second portable device 650*b* through the communication unit 620 in step S1150. The user of the second portable device 650*b* may manipulate or display on the display the received content using the second portable device 650*b*. For example, if the content received from the first portable device 650*a* is a text message, the same text message may be displayed on the display of the second portable device 650*b*. In addition, the user of the second portable device 650*b* may delete the text message displayed on the display or compose a reply to the text message.

If it is judged that the second portable device 650*b* does not have access authority for the use grade set with respect to the content received from the first portable device 650*a*, the process S1100 may be ended.

Figure 12:
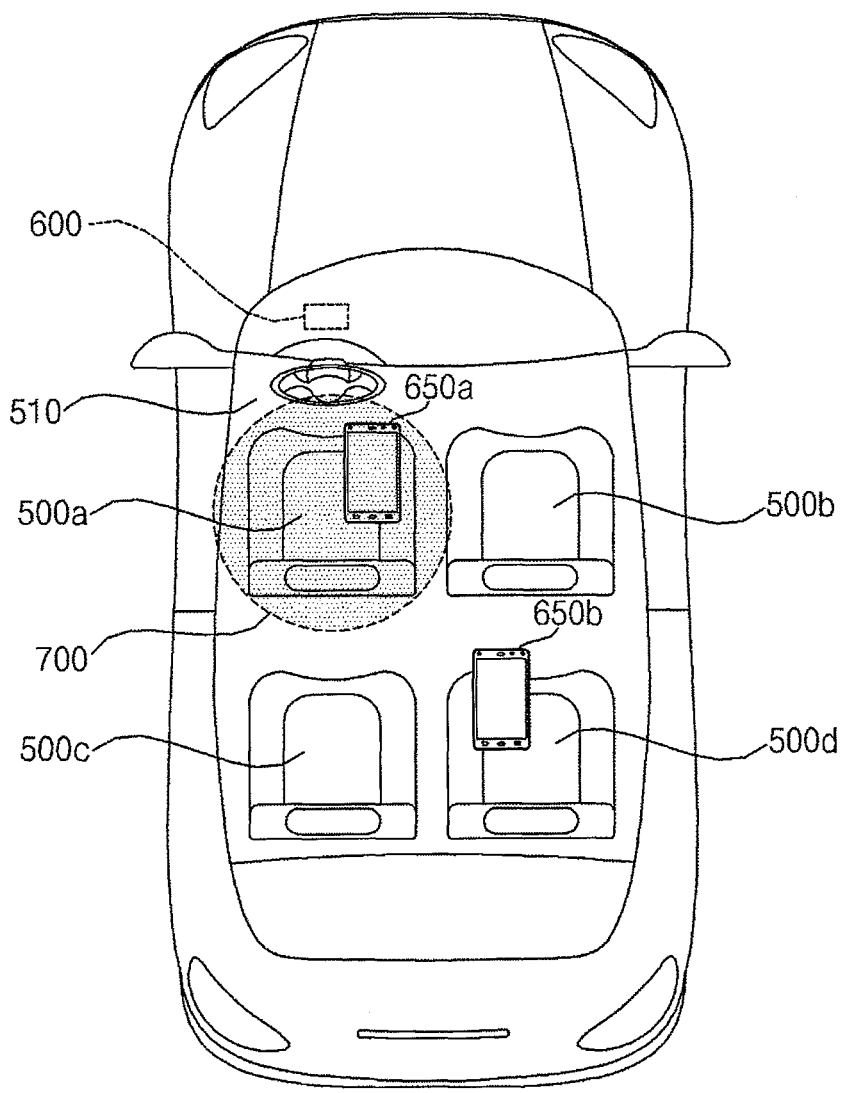
FIG. 12 illustrates a passenger compartment of a vehicle in which a plurality of portable devices is positioned according to an embodiment of the present invention.

FIG. 12 illustrates the passenger compartment 510 of the vehicle 1 in which a plurality of portable devices is positioned. For convenience of description, it is assumed that the vehicle 1 is operating in a manual driving mode.

Referring to FIG. 12, the first portable device 650*a* is currently located within the limited region 700 similar to the example of FIG. 9. In addition, the second portable device 650*b* is currently located outside of the limited region 700. For example, the second portable device 650*b* may be located near the passenger seat 500*d* as illustrated in FIG. 12.

In this instance, since the strength of a detection signal, measured by the first portable device 650*a*, will be equal to or greater than the threshold value described with reference to FIG. 9A, the processor 640 may judge that the first portable device 650*a* is currently located within the limited region 700. Meanwhile, since the second portable device 650*b* is located outside of the limited region 700, the strength of a detection signal, measured by the second portable device 650*b*, may be less than the threshold value. Therefore, the processor 640 may judge that the second portable device 650*b* is currently located outside of the limited region 700.

The processor 640 may deactivate execution of at least one function of the first portable device 650 through the communication unit 620. Further, execution of all functions of the second portable device 650*b* may not be deactivated.

As execution of at least one function of the first portable device 650*a* is deactivated, restriction on freely using the first portable device 650*a* may be imposed, thereby aiding in preventing driver distraction. In this instance, at least part of content stored in the first portable device 650*a* needs to be transmitted to another portable device in the passenger compartment 510. For example, if a message to be urgently checked cannot be displayed by first portable device 650*a* because execution of its display function is deactivated, the message may be transmitted to a portable device of a passenger so that the passenger can check the message (e.g., the driver's messages are relayed to the passenger, so the passenger can respond to the messages on the driver's behalf).

Meanwhile, although only two portable devices 650*a* and 650*b* are illustrated in FIG. 12, it should be understood that more portable devices may be positioned in the passenger compartment 510.

Unlike FIG. 12, if the second portable device 650*b* is also located within the limited region 700, it will be apparent to those skilled in the art that execution of at least one function of the second portable device 650*b* may be deactivated by the processor 640.

Figure 13A:
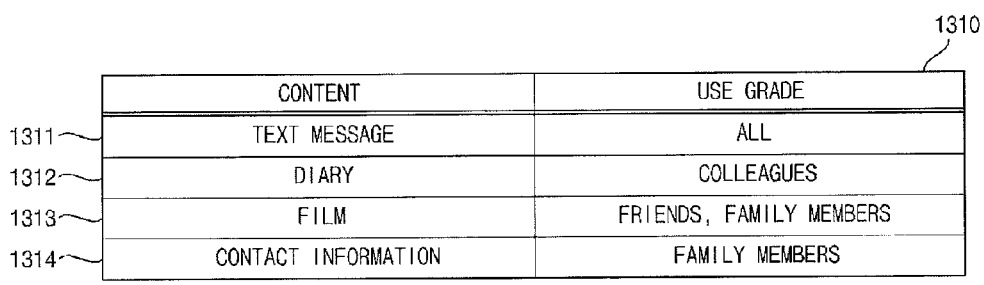
FIG. 13A illustrates an exemplary data structure used to set a use grade for content received from a portable device in a vehicle according to an embodiment of the present invention.

FIG. 13A illustrates an exemplary data structure 1310 used to set a use grade for content received from a portable device in the vehicle 1.

Referring to FIG. 13A, the memory 610 may store the data structure 1310 and the data structure 1310 may include a plurality of items 1311, 1312, 1313, and 1314.

Each item includes a type of content and at least one use grade set with respect to each type of content.

For example, an "all" grade may be set for a text message received from the first portable device 650*a* illustrated in FIG. 12. That is, the text message may have a grade permitting everybody to access the text message. As another example, a diary received from the first portable device 650*a* may have a grade permitting only "colleagues" to access the diary. As still another example, a film or video received from the first portable device 650*a* may have a grade permitting only "friends" or "family members" to access the film. As another example, contact information received from the first portable device 650*a* may have a grade permitting only "family members" to access the contact information.

Figure 13B:
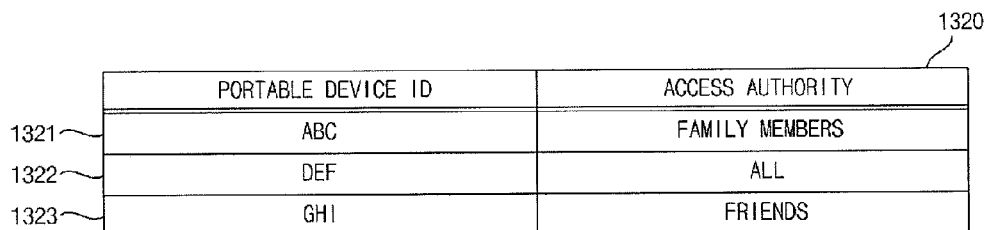
FIG. 13B illustrates an exemplary data structure used to identify access authority of a portable device in a vehicle in relation to FIG. 13A according to an embodiment of the present invention.

FIG. 13B illustrates an exemplary data structure 1320 used to identify access authority of a portable device in the vehicle 1 in relation to FIG. 13A.

Referring to FIG. 13B, the memory 610 may store the data structure 1320 and the data structure 1320 may include a plurality of items 1321, 1322, and 1323.

Each item includes identification information (e.g., an ID) of a portable device and access authority of a portable device corresponding to the identification information.

Figure 13C:
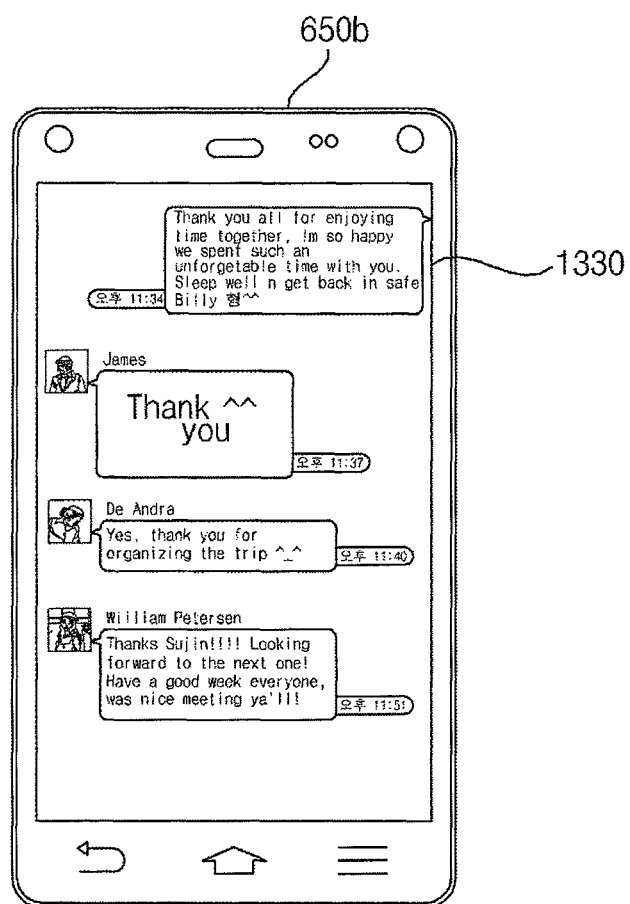
FIGS. 13C and 13D illustrate operation of a second portable device in relation to FIG. 12 according to an embodiment of the present invention.

If the ID of the second portable device 650*b* illustrated in FIG. 12 is "ABC," the processor 640 may judge that the second portable device 650*b* has the authority to access content whose grade is set to "family members." Then, the processor 640 may transmit text messages, films, or contact information received from first portable device 650*a* to the second portable device 650*b* through the communication unit 620. For example, as illustrated in FIG. 13C, a text message 1330 received from the first portable device 650*a* may be displayed on the display of the second portable device 650*b*.

If the ID of the second portable device 650*b* illustrated in FIG. 12 is "DEF", the processor 640 may judge that the second portable device 650*b* has the authority to access all types of content. Then, the processor 640 may transmit all types of content received from the first portable device 650a to the second portable device 650b through the communication unit 620.

Figure 13D:
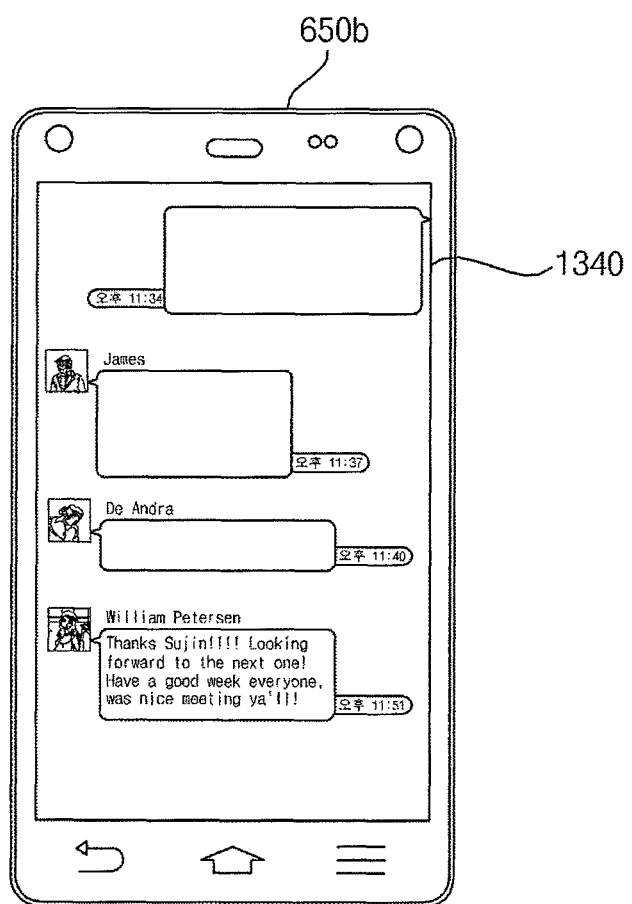

If the ID of the second portable device 650b illustrated in FIG. 12 is "GHI," the processor 640 may judge that the second portable device 650b has the authority to access content whose grade is set to "friends." Then, the processor 640 may transmit text messages and films received from the first portable device 650a to the second portable device 650b through the communication unit 620. In this instance, the processor 640 may hide a part of the contents of content transmitted to the second portable device 650b according to a voice command of a driver or a predetermined rule. For example, as illustrated in FIG. 13D, only the most recently received text message among the contents of a text message 1330 received from the first portable device 650a may be displayed in the screen 1340 of the second portable device 650b.

If the ID of the second portable device 650b illustrated in FIG. 12 is "JKL," since the ID matching "JKL" is not included in the data structure 1320, the processor 640 may judge that the second portable device 650b has no authority to access content received from the first portable device 650a.

Figure 14:
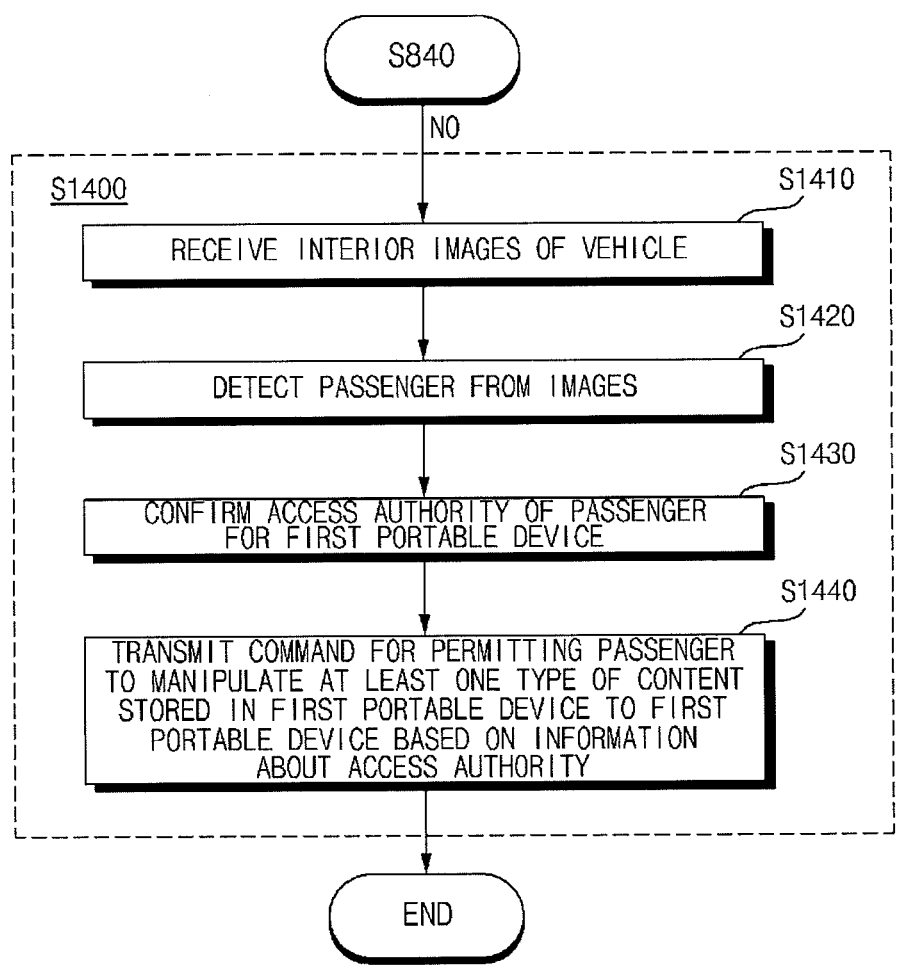
FIG. 14 is a flowchart of another process performed by a portable device control apparatus illustrated in FIG. 6 according to an embodiment of the present invention.

FIG. 14 is a flowchart of another process S1400 performed by the portable device control apparatus 600 illustrated in FIG. 6 according to an embodiment of the present invention. For convenience of description, it is assumed that the vehicle 1 is currently in a manual driving mode and the process S1400 is performed upon judging that the current location of the first portable device 650a in step S840 is outside of the limited region 700.

Figure 15:
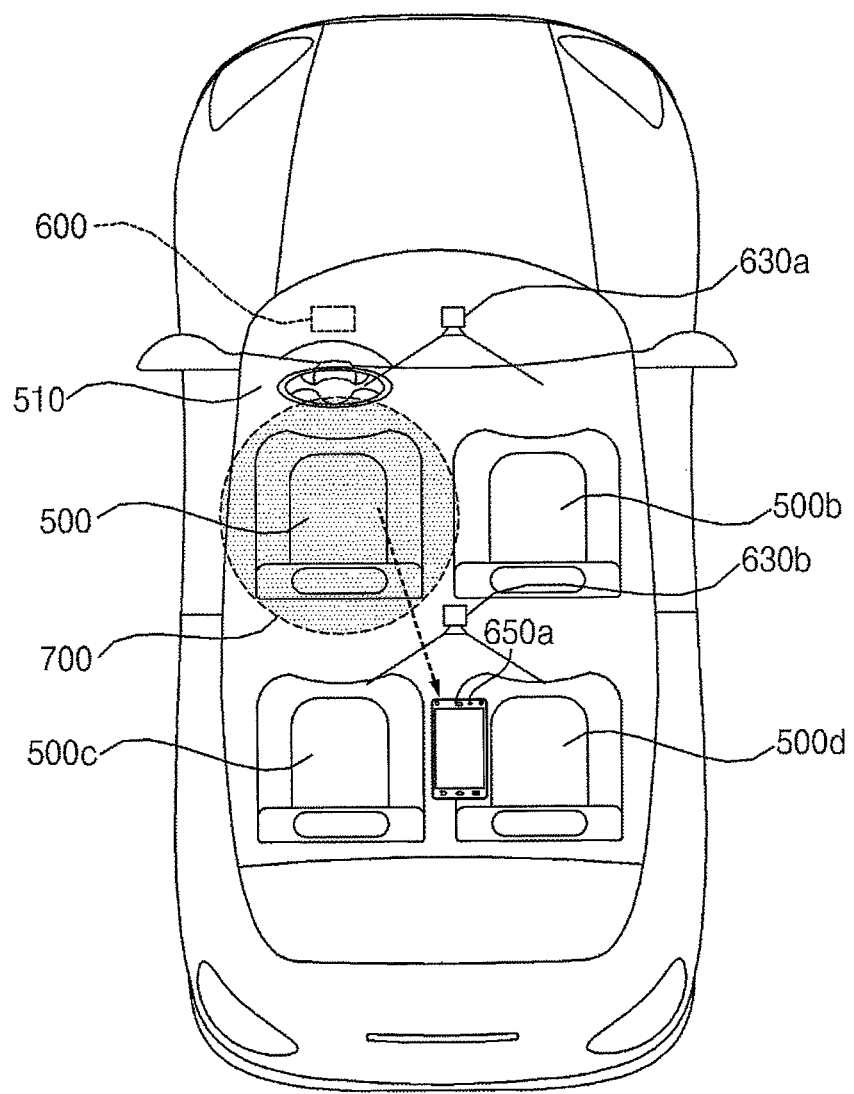
FIG. 15 illustrates a passenger compartment of a vehicle in relation to FIG. 14 according to an embodiment of the present invention.

In step S1410, the processor 640 receives interior images of the vehicle 1 from the camera 630. At least one camera 630 may be installed in the vehicle 1. If a plurality of cameras is installed in the vehicle 1, the cameras may be arranged at different locations. For example, as illustrated in FIG. 15, a camera 630a for generating images of the driver seat 500 and the passenger seat 500b and a camera 630b for generating images of the other passenger seats 500c and 500d may be arranged in the passenger compartment 510.

In step S1420, the processor 640 detects a passenger from the interior images of the vehicle 1. Specifically, the processor 640 may detect the face of a passenger from the images, compare the detected face of the passenger with one or more reference images pre-stored in the memory 610, and search for a reference image matching the face of the passenger. If a reference image matching the face of the passenger is detected, the processor 640 may determine an identity of the passenger based on the reference image. For example, the processor 640 may judge an identity of a person seated in the passenger seat 500b in the passenger compartment 510, i.e., how are the driver and the passenger related (e.g., a family member, a friend, a colleague, or a customer).

In step S1430, the processor 640 confirms access authority of the passenger with respect to the first portable device 650a. Namely, the processor 640 may confirm whether the passenger is a person who is permitted to access at least one type of content stored in the first portable device 650a in step S1430. In addition, the processor 640 may determine content that the passenger can access among types of content stored in the first portable device 650a. For example, if a first passenger and a second passenger are located in the passenger compartment 510, the processor 640 may individually determine content that the first passenger is permitted to access and content that the second passenger is permitted to access.

In step S1440, the processor 640 transmits a command for permitting the passenger to manipulate at least one type of content stored in the first portable device 650a to the first portable device 650a based on information about access authority. As an example, if a passenger has the authority to access all types of content stored in the first portable device 650a, the passenger may access all types of content stored in the first portable device 650a and check, edit, or delete at least one of the types of content. As another example, if a passenger is a family member of the user of the first portable device 650a, the passenger may check content to which only family members can perform access among all types of content stored in the first portable device 650a. If the passenger attempts to execute content that the passenger is not permitted to access, the first portable device 650a may display a warning message on the display of the first portable device 650a.

FIG. 15 illustrates the passenger compartment 510 of the vehicle 1 in relation to FIG. 14. For convenience of description, it is assumed that the vehicle 1 is in a manual driving mode.

Referring to FIG. 15, the processor 640 may detect movement of each portable device in the passenger compartment 510. That is, as described above, the strength of a detection signal, measured by a portable device, varies according to the location of the portable device in the passenger compartment 510. Therefore, the processor 640 may detect movement of each portable device in the passenger compartment 510 based on signal strength included in a response signal transmitted in real time or periodically from the portable device.

In addition, as illustrated in FIG. 15, if the first portable device 650a moves towards the passenger seat 500d of the second column from the vicinity of the driver seat 500, the processor 640 may judge that the first portable device 650a is not currently located within the limited region 700. For example, if a driver passes the first portable device 650a to a passenger seated in the passenger seat 500d, the first portable device 650a will be located outside of the limited region 700. Then, the processor may not deactivate execution of all functions of the first portable device 650a.

In addition, if the user of the first portable device 650a passes the first portable device 650a to a passenger outside of the limited region 700, the user of the first portable device 650a may or may not want or permit the passenger to manipulate the first portable device 650a according to the passenger.

In relation to this, the processor 640 may recognize voice of the driver and may permit the passenger to perform access only to content corresponding to recognized voice. For example, if the driver, who is the user of the first portable device 650a, says "only messages," the processor 640 may receive the voice of the driver from the microphone 123 and transmit a command corresponding to the received voice to the first portable device 650a. The first portable device 650a may provide messages stored in the first portable device 650a to the passenger seated in the passenger seat 500d and deny manipulation of the other content performed by the passenger according to the command received from the processor 640.

In addition, the processor 640 may detect passengers in the passenger compartment 510 and control the first portable device 650a according to the detected result. This will be described with reference to FIGS. 16A to 16D.

FIG. 16A illustrates an exemplary data structure 1610 used to confirm the identities of passengers in the vehicle 1.

Referring to FIG. 16A, the memory 610 may store the data structure 1610 and the data structure 1610 may include a plurality of items 1611, 1612, and 1613.

Each item may include a reference image and the name of a person corresponding to the reference image.

If the face of a passenger detected in step S1420 of FIG. 14 matches a first image, the processor 640 may judge that the passenger is "Liam." If the face of the passenger matches a second image, the processor 640 may judge that the passenger is "Ethan." If the face of the passenger matches a third image, the processor 640 may judge that the passenger is "Diana."

In addition, if reference images matching the detected face of the passenger are not included in the data structure 1610, the processor 640 may transmit a command for deactivating execution of all functions of the first portable device 650a to the first portable device 650a even if the first portable device 650a is located outside of the limited region 700.

Further, although the data structure 1610 of FIG. 16A distinguishes between passengers based on name, the present invention is not limited thereto. That is, any type of information capable of distinguishing one passenger from other passengers may be used. For example, telephone numbers or addresses may be used to distinguish between passengers.

FIG. 16B illustrates an exemplary data structure 1620 used to identify access authority of passengers in the vehicle 1 in relation to FIG. 16A.

Referring to FIG. 16B, the memory 610 may store the data structure 1620 and the data structure 1620 may include a plurality of items 1621, 1622, and 1623.

Each item includes a name and access authority assigned to the name.

Figure 16C:
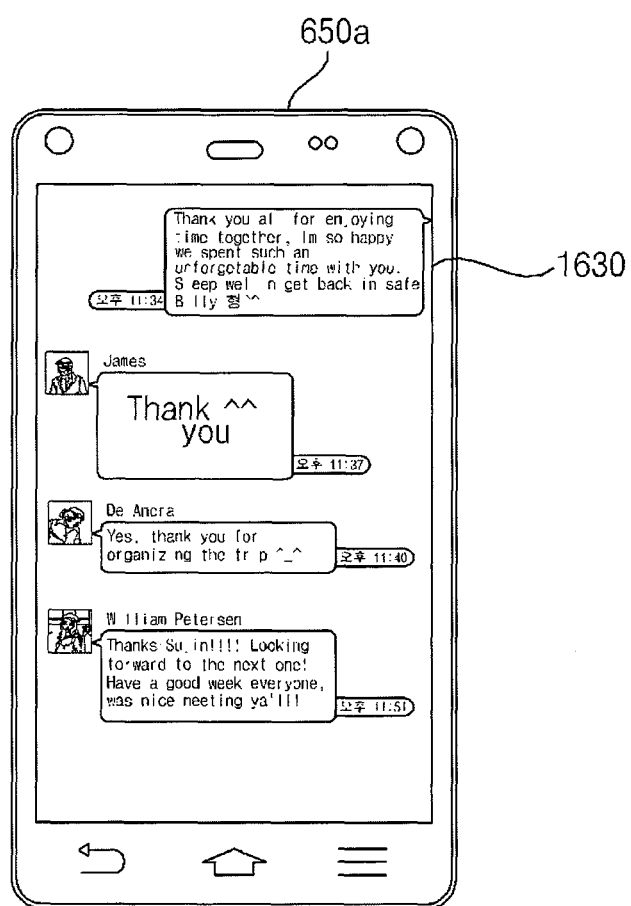
FIGS. 16C and 16D illustrate operation of the first portable device in relation to FIG. 15 according to an embodiment of the present invention.

If the name of a passenger seated in the passenger seat 500d illustrated in FIG. 15 is "Liam," the processor 640 may judge that the passenger has the authority to access content whose grade is set to "friends" or "family members." The processor 640 may judge that access by "Liam" to text messages, films, and contact information is permitted based on the data structure 1310 illustrated in FIG. 13A. Then, the processor 640 may transmit a command for permitting "Liam" to manipulate the text messages, films, and contact information to the first portable device 650a through the communication unit 620. For example, as illustrated in FIG. 16C, a text message 1630 among types of content of the first portable device that "Liam" is permitted to access may be displayed on the display of the first portable device 650a.

If the name of a passenger seated in the passenger seat 500d illustrated in FIG. 15 is "Ethan," the processor 640 may judge that the passenger has the authority to access all types of content stored in the first portable device 650a. The processor 640 may judge that access by "Ethan" to text messages, films, diaries, and contact information is permitted based on the data structure 1310 illustrated in FIG. 13A. Then, the processor 640 may transmit a command for permitting "Ethan" to manipulate the text messages, films, diaries, and contact information to the first portable device 650a through the communication unit 620.

Figure 16D:
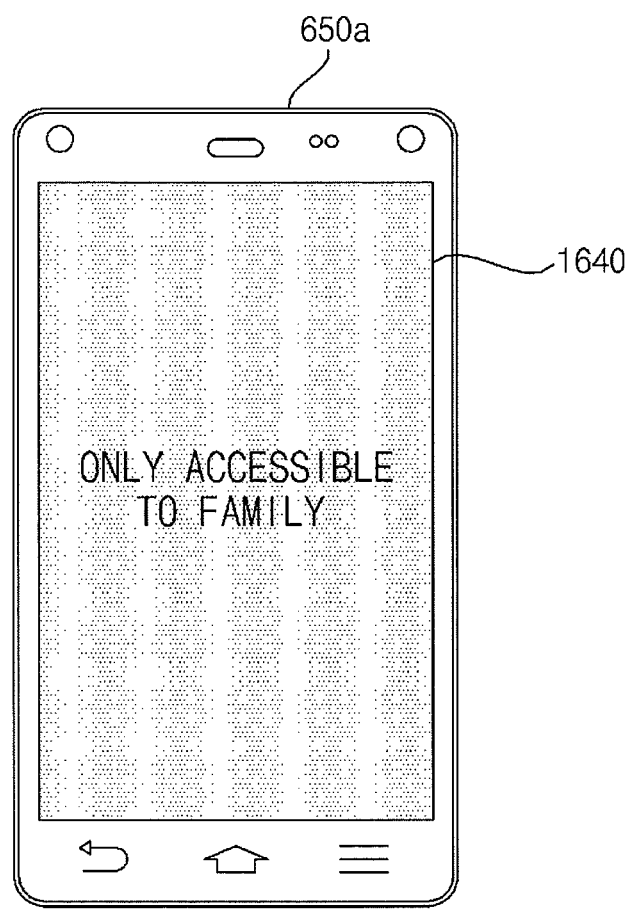

If the name of a passenger seated in the passenger seat 500d illustrated in FIG. 15 is "Diana," the processor 640 may judge that the passenger has the authority to access content whose grade is set to 'friends," That is, the processor 640 may confirm that the user of the first portable device 650a and "Diana" are friends. The processor 640 may judge that access by "Diana" to text messages and films is permitted based on the data structure 1310 illustrated in FIG. 13A. Then, the processor 640 may transmit a command for permitting "Diana" to manipulate the text messages, and films to the first portable device 650a through the communication unit 620. If "Diana" attempts to access contact information to which only "family members" are permitted to perform access, a warning message as illustrated in FIG. 16D may be displayed on the display screen 1640 of the first portable device 650a.

Figure 17:
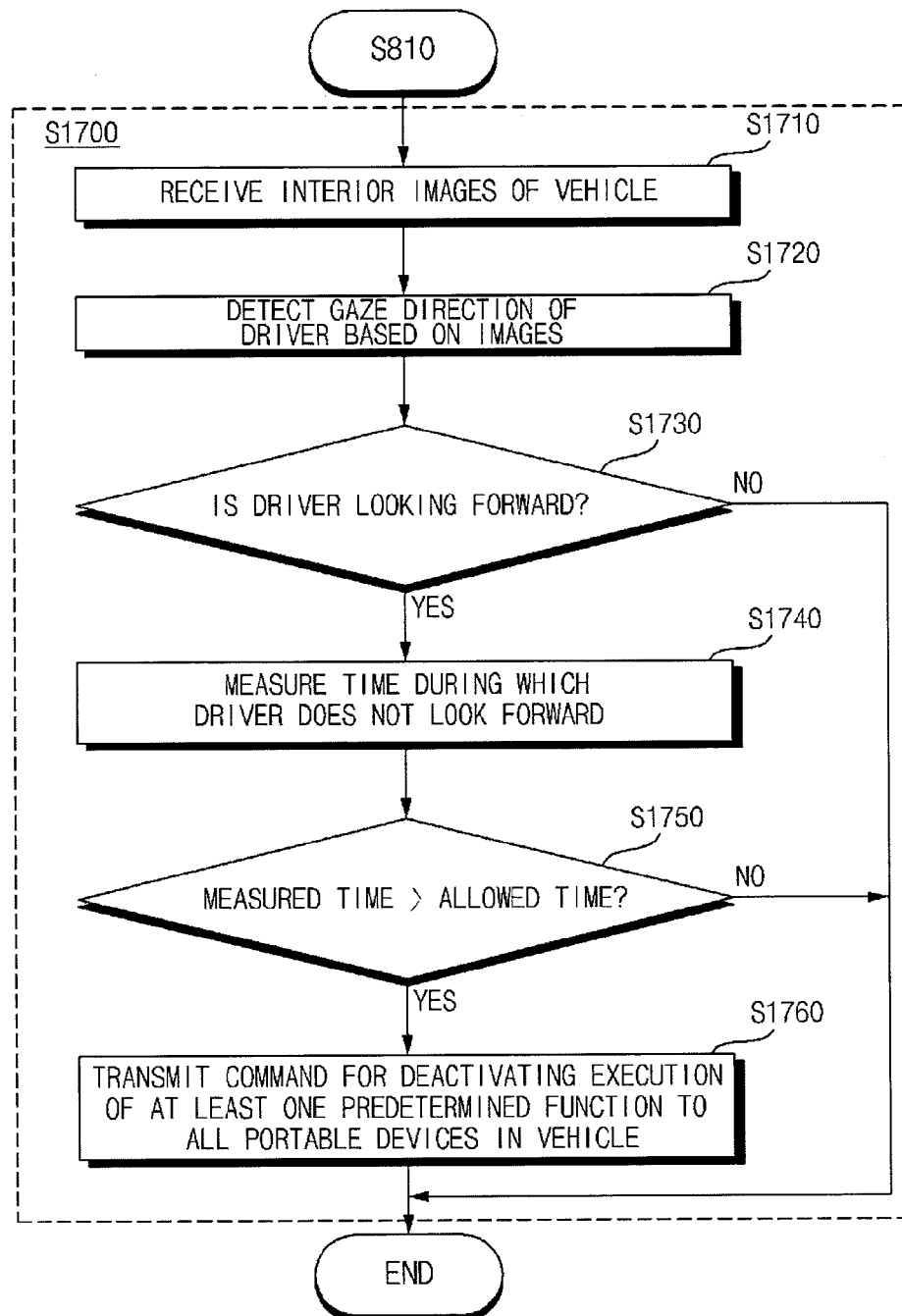
FIG. 17 is a flowchart of a process performed by the portable device control apparatus illustrated in FIG. 6 according to an embodiment of the present invention.

FIG. 17 is a flowchart of a process S1700 performed by the portable device control apparatus 600 illustrated in FIG. 6 according to an embodiment of the present invention. The process S1700 may be initiated when the vehicle 1 is in a manual driving mode.

In step S1710, the processor 640 receives interior images of the vehicle 1 from the camera 630. For example, the processor 640 may receive the images from the camera 630a for generating images including an image of the driver seat 500 out of the two cameras 630a and 630b illustrated in FIG. 15.

In step S1720, the processor 640 detects a gaze direction of a driver based on the images. For example, the processor 640 may determine the gaze direction of the driver by tracking pupils of the driver detected from the images. As another example, the processor 640 may determine the gaze direction of the driver based on the direction of the head or face of the driver detected from the images.

In step S1730, the processor 640 judges whether the driver is looking forward based on the detected gaze direction of the driver. Specifically, the processor 640 may acquire a predetermined range corresponding to a forward visual field from the memory 610 and judge whether the gaze direction of the driver is within the predetermined range. That is, if the gaze direction of the driver is within the predetermined range, the processor 640 may judge that the driver is looking forward. Further, if the gaze direction of the driver is outside of the predetermined range, the processor 640 may judge that the driver is not currently looking forward.

In step S1740, the processor 640 measures a time during which the driver does not look forward. In step S175, the processor 640 judges whether the time measured in step S1740 exceeds a predetermined allowed time. A detailed description related to the allowed time will be described later with reference to FIG. 19A. If it is judged that the measured time exceeds the allowed time in step S1750, the processor 640 performs an operation of step S1760.

In step S1760, the processor 640 may transmit a command for deactivating execution of at least one predetermined function to all portable devices in the vehicle 1 through the communication unit 610. That is, if the driver is not looking forward, the processor 640 may control the portable devices such that users of the portable devices cannot access specific functions regardless of current locations of the portable devices in the vehicle 1.

Figure 18:
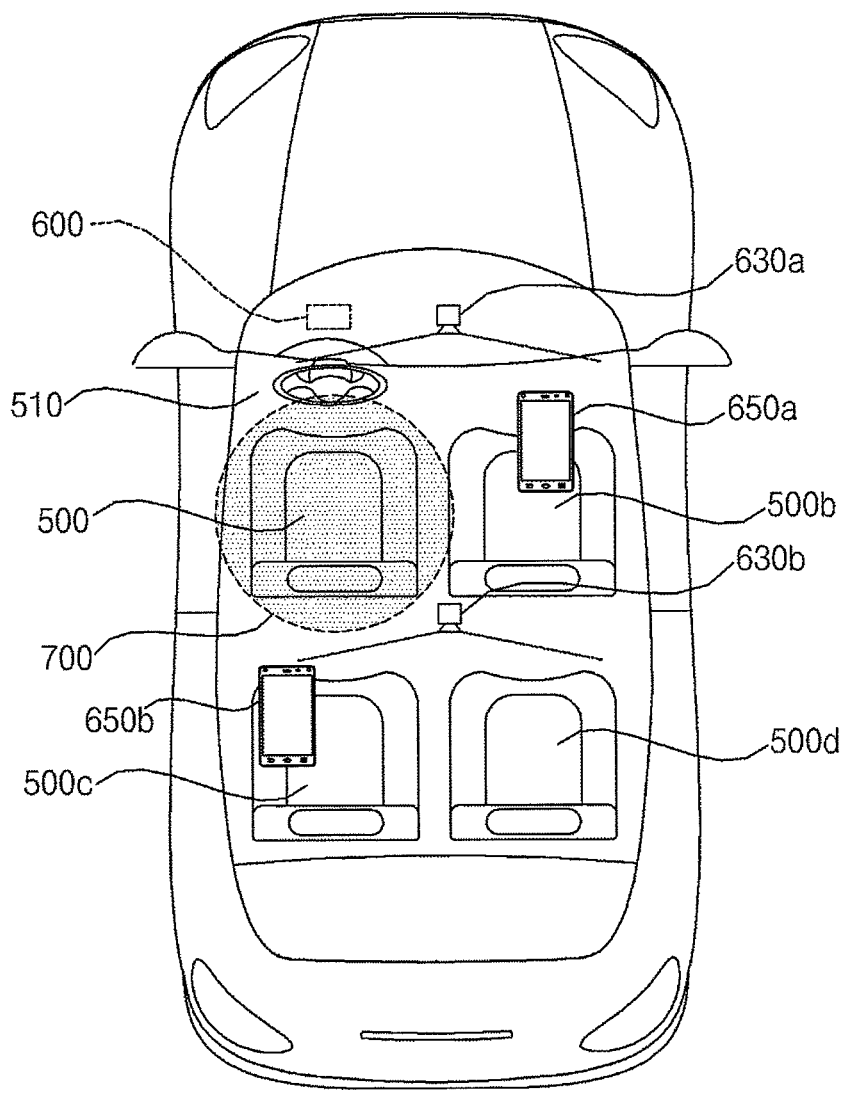
FIG. 18 illustrates a passenger compartment of a vehicle in relation to FIG. 17 according to an embodiment of the present invention.

FIG. 18 illustrates the passenger compartment 510 of the vehicle 1 in relation to FIG. 17. For convenience of description, it is assumed that the vehicle 1 is in a manual driving mode and the first portable device 650a and the second portable device 650b are positioned in the passenger compartment 510.

Referring to FIG. 18, both the first portable device 650a and the second portable device 650b are currently located outside of the limited region 700. For example, as illustrated in FIG. 18, the first portable device 650a may be located near the passenger seat 500*b* and the second portable device 650*b* may be positioned near the passenger seat 500*c*.

In this instance, since the strength of detections signals measured by the first portable device 650*a* and the second portable device 650*b* will be less than the threshold value described with reference to FIG. 9A, the processor 640 may judge that the first portable device 650*a* and the second portable device 650*b* are currently outside of the limited region 700. Accordingly, passengers may freely manipulate the first portable device 650*a* and the second portable device 650*b* without restriction.

Further, a driver may turn his or her head or may not look forward while driving the vehicle 1 in order to confirm information displayed on the first portable device 650*a* or the second portable device 650*b* which is outside of the limited range 700. This is a dangerous behavior that may lead to an accident. Therefore, if the driver does not look forward, it is necessary to deactivate all portable devices 650*a* and 650*b* in the vehicle 1.

Meanwhile, although FIG. 18 illustrates a situation in which both the first portable device 650*a* and the second portable device 650*b* are outside of the limited region 700, the processor 640 may identically control the first portable device 650*a* and the second portable device 650*b* even when at least one thereof is within the limited region 700. That is, operation of the processor 640 executed when the driver does not look forward may be irrelevant to the locations of the portable devices in the passenger compartment 510.

Figure 19A:
FIG. 19A illustrates a data structure used to determine an allowed time in relation to FIG. 17 according to an embodiment of the present invention.

FIG. 19A illustrates a data structure 1910 used to determine an allowed time in relation to FIG. 17.

The processor 640 may determine an allowed time based on at least one of the speed of the vehicle 1 and the type of road on which the vehicle 1 is located. Referring to FIG. 19A, the memory 610 may store the data structure 1910. The data structure 1910 may include a plurality of allowed times associated with a plurality of predetermined speeds and types of road.

The processor 640 may receive a current speed of the vehicle 1 from the sensing unit 160. In addition, the processor 640 may receive a current location of the vehicle 1 from the communication unit 110 and acquire a type of road corresponding to the current location of the vehicle 1 from an electronic map stored in the memory 610. For example, as illustrated in FIG. 19A, types of road may include an expressway, a school zone, and a sharp curve area.

The processor 640 may determine different allowed times even at the same speed of the vehicle 1 according to types of road corresponding to the current location of the vehicle 1. For example, assuming that the current speed of the vehicle 1 is 70 km/h, if the vehicle 1 is currently located on an expressway, the processor 640 may set 2.5 seconds as an allowed time. If the vehicle 1 is currently located in a school zone, the processor 640 may set 2 seconds as an allowed time. If the vehicle 1 is currently located in a sharp curve area, the processor 640 may set 1.5 seconds as an allowed time.

The processor 640 may determine a short allowed time even on the same type of road as the speed of the vehicle 1 increases. For example, assuming that the vehicle 1 is currently located on an expressway, if the current speed of the vehicle 1 is 20 km/h, the processor 640 may set 3 seconds as an allowed time among predetermined allowed times. If the current speed of the vehicle 1 is 50 km/h, the processor 640 may set 2.5 seconds as an allowed time among the predetermined allowed times. If the current speed of the vehicle 1 is 110 km/h, the processor 640 may set 2 seconds as an allowed time among the predetermined allowed times.

Figure 19B:
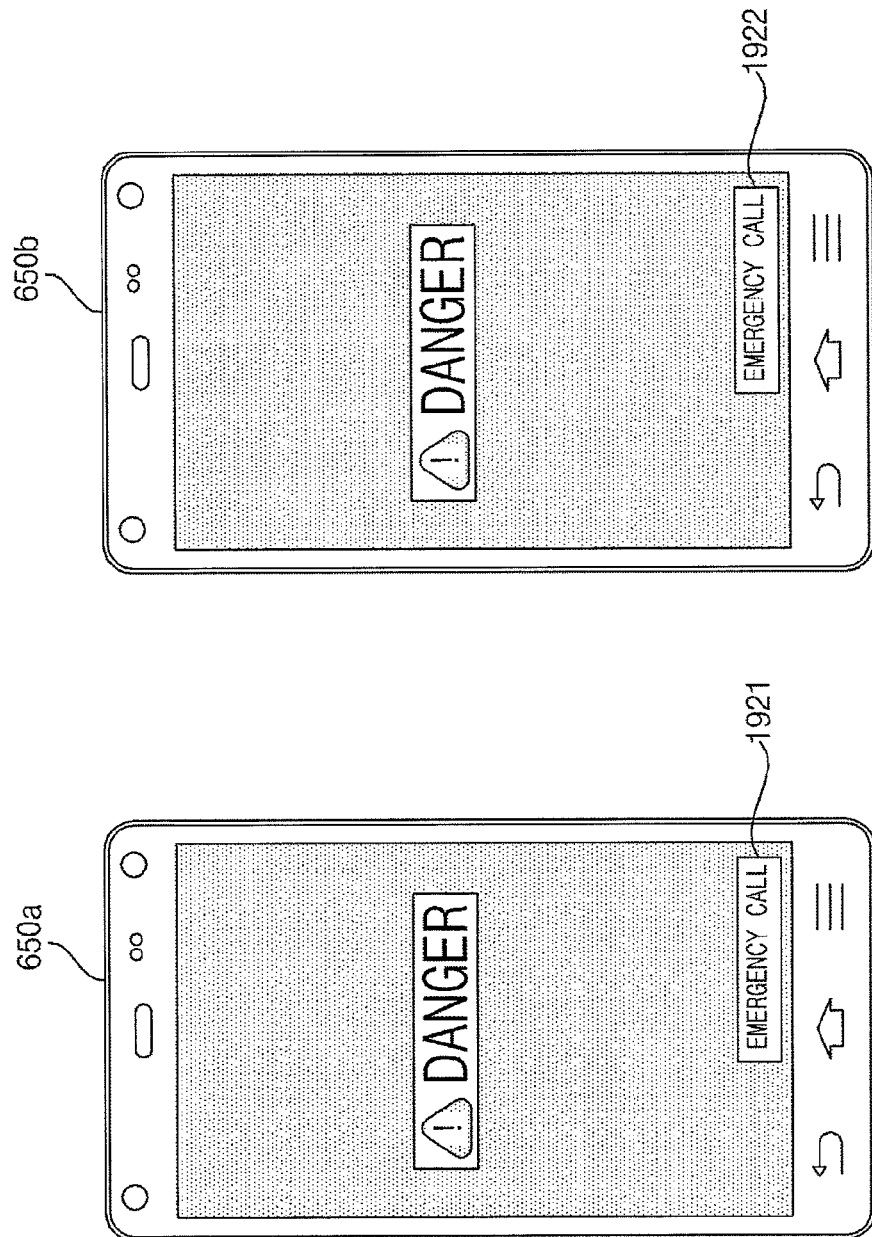
FIG. 19B illustrates a time during which a driver does not look forward exceeds a predetermined allowed time according to an embodiment of the present invention.

FIG. 19B illustrates a time during which a driver does not look forward exceeds a predetermined allowed time.

Assuming that the vehicle 1 currently drives at a speed of 90 km/h on an expressway, the processor 640 selects 2.5 seconds as an allowed time among a plurality of predetermined allowed times with reference to the data structure 1910 illustrated in FIG. 19A.

As described above, the processor 640 may detect the gaze direction of a driver seated in the driver seat 500 based on images provided by the camera 630*a*. The processor 640 judges whether a time during which the gaze direction of the driver is outside of a predetermined range, i.e. a time during which the driver does not look forward, exceeds the allowed time of 2.5 seconds. If the time during which the driver does not look forward exceeds 2.5. seconds, the processor 640 may stop operation of all portable devices in the passenger compartment 510, which are detected in step S810, until the gaze of the driver is directed within a predetermined range. Specifically, the processor 640 may transmit a command for deactivating execution of all elements or all functions of all portable devices in the passenger compartment 510 through the communication unit 620.

For example, in order to stop operation of all portable devices in the passenger compartment 510, a danger warning message may be displayed in the screens of the first portable device 650*a* and the second portable device 650*b* illustrated in FIG. 18 by the command transmitted by the communication unit 620 as the driver does not look forward. In this instance, even if the driver or passengers manipulate a touchscreen or a button of the first portable device 650*a* and the second portable device 650*b*, the first portable device 650*a* and the second portable device 650*b* may not react.

Even in this instance, however, buttons 1921 and 1922 for an emergency call to request rescue during occurrence of an accident may be displayed on the displays of the first portable device 650*a* and the second portable device 650*b*, respectively.

As is apparent from the above description, the effects of a portable device control apparatus and method according to an embodiment of the present invention are as follows.

According to at least one of the embodiments of the present invention, portable devices can be selectively controlled by detecting portable devices positioned within a predetermined limited region in a vehicle. In particular, users of portable devices outside of the limited region can freely manipulate the portable devices.

According to at least one of the embodiments of the present invention, if a portable device of a driver is passed to a passenger, access to specific functions of the portable device of the driver by the passenger may be or may not be permitted by confirming the identity of the passenger. Then, instead of the driver, the passenger may check only urgent content that needs to be rapidly confirmed among types of content stored in the portable device of the driver.

According to at least one of the embodiments of the present invention, portable devices can be controlled suitably to a driving situation of a vehicle by controlling the number or types of deactivated functions of a portable device within a limited region according to the state or surrounding environment of the vehicle.

Effects according to the present invention are not limited to what has been particularly described hereinabove and other effects not described herein will be more clearly understood by persons skilled in the art from the claims.

The embodiments of the present invention as described above are not limited to implementation via the apparatus and the method and may be implemented via a program that realizes a function corresponding to the configuration of each embodiment of the present invention or a recording medium in which the program is recorded. This implementation will be easily realized by experts in the art of the present invention from the above description of the embodiments.

In addition, it should be readily understood that the invention is not limited to the embodiments described above and the accompanying drawings. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description of the embodiments and the accompanying drawings, and some or all of the embodiments may be selectively combined with one another to achieve various alterations.

What is claimed is:

1. A portable device control apparatus comprising:
    a communication unit configured to detect at least a first portable device in a passenger compartment of a vehicle; and
    a processor configured to:
    select at least one function of the first portable device to be deactivated based on the first portable device being located within a predetermined limit region including at least part of the driving seat of the vehicle,
    transmit a command for deactivating an execution of at least one function to the first portable device through the communication unit,
    detect a second portable device positioned outside of the predetermined limited region,
    receive content stored in the first portable device from the first portable device through the communication unit and set any one of a plurality of predetermined use grades for controlling access to the content,
    receive identification information of the second portable device from the second portable device through the communication unit and an access authority for a use grade set with respect to the content based on the identification information of the second portable device, and
    transmit the content to the second portable device based on the access authority for the use grade set for accessing the content.

2. The portable device control apparatus according to claim 1, wherein the communication unit is further configured to transmit a detection signal to the first portable device and receive a response signal transmitted by the first portable device, the response signal including a strength of the detection signal received by the first portable device.

3. The portable device control apparatus according to claim 2, wherein the processor is further configured to transmit the command for deactivating the execution of the at least one function to the first portable device when the strength of the detection signal is within a predetermined range corresponding to the predetermined limited region.

4. The portable device control apparatus according to claim 2, wherein the detection signal and the response signal are transmitted and received through at least one of Bluetooth communication and Wi-Fi communication.

5. The portable device control apparatus according to claim 1, wherein the processor is further configured to transmit the command for deactivating the execution of the at least one function to the first portable device based on at least one of a past driving history of a driver of the vehicle, state information of the vehicle, and surrounding environment information of the vehicle.

6. The portable device control apparatus according to claim 5, wherein the state information of the vehicle includes a current speed, a current direction, and a current location of the vehicle.

7. The portable device control apparatus according to claim 5, wherein the surrounding environment information of the vehicle includes a road type, weather, a traffic situation, a route, and an obstacle.

8. The portable device control apparatus according to claim 1, wherein the processor is further configured to stop transmitting the command for deactivating the execution of the at least one function to the first portable device when the first portable device moves outside of the predetermined limited region.

9. The portable device control apparatus according to claim 1, wherein the processor is further configured to transmit a command corresponding to a voice of a driver of the vehicle to the first portable device through the communication unit when the first portable device is outside of the predetermined limited region.

10. The portable device control apparatus according to claim 1, wherein the content includes at least one of text messages, voice messages, schedules, memos, photos, music, and private information.

11. The portable device control apparatus according to claim 1, further comprising:
    a camera configured to provide an interior image of the vehicle,
    wherein the processor is further configured to detect a passenger from the interior image and receive an access authority for the use grade set for accessing the content.

12. The portable device control apparatus according to claim 1, wherein the vehicle is in a manual driving mode.

13. The portable device control apparatus according to claim 12, wherein the processor is further configured to stop transmitting the command when the vehicle switches from the manual driving mode to an autonomous driving mode.

14. The portable device control apparatus according to claim 1, further comprising:
    a camera configured to provide an interior image of the vehicle,
    wherein the processor is further configured to:
    detect a gaze direction of a driver from the interior image, and
    transmit a command for deactivating access to at least one predetermined function to all portable devices in the vehicle when the gaze direction is outside of the predetermined range.

15. The portable device control apparatus according to claim 14, wherein the processor is further configured to:
    measure a time during which the gaze direction is outside of the predetermined range, and
    transmit the command for deactivating access to the at least one predetermined function to all portable devices in the vehicle when a measured time exceeds an allowed time set based on a speed of the vehicle and a type of road on which the vehicle is located.

16. The portable device control apparatus according to claim 14, wherein the at least one predetermined function includes an information display function.

\* \* \* \* \*